United States Patent
Stickle et al.

(10) Patent No.: US 9,032,070 B1
(45) Date of Patent: May 12, 2015

(54) METHODS AND APPARATUS FOR PROVIDING INLINE NETWORK TRAFFIC MONITORING

(75) Inventors: Thomas C. Stickle, Saint James, NY (US); Eric J. Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 133 days.

(21) Appl. No.: 13/461,601

(22) Filed: May 1, 2012

(51) Int. Cl.
*G06F 15/173* (2006.01)
*H04L 12/26* (2006.01)

(52) U.S. Cl.
CPC .................................. *H04L 12/2626* (2013.01)

(58) Field of Classification Search
CPC . H04L 63/14; H04L 63/1408; H04L 63/1416; H04L 63/1425
See application file for complete search history.

(56) References Cited

U.S. PATENT DOCUMENTS

| | | | |
|---|---|---|---|
| 7,746,862 B1 | 6/2010 | Zuk et al. | |
| 8,069,481 B2 | 11/2011 | Judge | |
| 8,224,952 B2 | 7/2012 | Aaron et al. | |
| 8,578,017 B2 | 11/2013 | Cobb et al. | |
| 2005/0039047 A1* | 2/2005 | Raikar et al. | 713/201 |
| 2005/0278565 A1 | 12/2005 | Frattura et al. | |
| 2006/0267802 A1 | 11/2006 | Judge et al. | |
| 2009/0019535 A1 | 1/2009 | Mishra et al. | |
| 2009/0300045 A1* | 12/2009 | Chaudhry et al. | 707/102 |
| 2011/0219434 A1 | 9/2011 | Betz et al. | |
| 2012/0079566 A1 | 3/2012 | Barranco et al. | |

OTHER PUBLICATIONS

U.S. Appl. No. 13/461,604, filed May 1, 2012, Thomas C. Stickle, et al.
U.S. Appl. No. 13/461,597, filed May 1, 2012, Thomas C. Stickle, et al.
"Elastic Load Balancing," Amazon Web Services™ (AWS) web page (c) 2012, downloaded from http://aws.amazon.com/elasticloadbalancing/ on Mar. 10, 2012, pp. 1-3.
"Amazon Elastic Compute Cloud User Guide," Amazon Web Services™ Online Documentation, Copyright © 2012 Amazon Web Services LLC or its affiliates, Apr. 1, 2012, pp. 1-507.

(Continued)

*Primary Examiner* — Mohamed Wasel
*Assistant Examiner* — Tsung Wu
(74) *Attorney, Agent, or Firm* — Robert C. Kowert; Meyertons, Hood, Kivlin, Kowert & Goetzel, P.C.

(57) ABSTRACT

Methods and apparatus for providing inline network traffic monitoring such as intrusion detection to clients of a provider network. A client can configure new or existing components and specify that traffic monitoring be added on or at the components in the client's configuration on the provider network. Traffic monitoring is automatically and transparently added to the client's configuration on or at the components. Traffic to the client's configuration passes through the traffic monitoring technology. Traffic monitoring technology may be implemented on a resource in the client's configuration that implements other technology, such as a load balancer component. Alternatively, traffic monitoring technology may be implemented on separate components upstream or downstream of a resource that implements other technology. Traffic monitoring may be implemented at a network substrate level rather than at an overlay network level.

28 Claims, 26 Drawing Sheets

(56) References Cited

OTHER PUBLICATIONS

"Elastic Load Balancing Developer Guide," API Version Nov. 15, 2011, Amazon Web Services™ Online Documentation, Nov. 15, 2011, Copyright © 2012 Amazon Web Services LLC or its affiliates, pp. 1-120.

"Network Intrusion Detection Systems: Important IDS Network Security Vulnerabilities," Author: Simon Edwards, Top Layer Networks, Inc., Sep. 2002, pp. 1-19.

Implementing Networks Taps with Network Intrusion Detection Systems, Author: Nathan Einwechter, Symantec, Jun. 19, 2002, Downloaded from: http://www.symantec.com/connect/articles/implementing-networks-taps-network-intrusion-detection-systems, pp. 1-5.

Alert Logic Threat Manager™ and ActiveWatch for Amazon Web Services Product Overview, Alert Logic, Inc. online documentation, © 2012 Alert Logic, Inc., downloaded Apr. 30, 2012, pp. 1-2.

"Alert Logic Threat Manager™ and ActiveWatch for Amazon Web Services Data Sheet," Alert Logic, Inc., Alert Logic, Inc. online documentation, © 2012 Alert Logic, Inc., downloaded Apr. 30, 2012, pp. 1-2.

"Quick Start Guide for using Sourcefire Snort on Amazon EC2," SourceFire® online paper, Feb. 16, 2010, pp. 1-12.

"Cisco ASA 5500 Series IPS Solution," Cisco online PDF, © 2010 Cisco and/or its affiliates, pp. 1-2.

"Cisco ASA 5500 Series Adaptive Security Appliances," Cisco online product data sheet, © 2011 Cisco and/or its affiliates, pp. 1-22.

"Cisco 2800 Series Integrated Services Routers," Cisco online product data sheet, © 2010 Cisco and/or its affiliates, pp. 1-14.

* cited by examiner

METHODS AND APPARATUS FOR PROVIDING INLINE NETWORK TRAFFIC MONITORING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Network Traffic Monitoring Technologies

Examples of network traffic monitoring and inspection functions or services may include, but are not limited to, intrusion detection system (IDS) technology, intrusion prevention system (IPS) technology, data loss prevention (DLP) technology, various network analytics or traffic analysis functions, network forensics data collection services, and so on. As an example, intrusion detection system (IDS) technology is capable of analyzing network and system activities in order to identify possible intrusion incidents, record the relevant information, and finally report those incidents to system administrators. An IDS is typically deployed as a host-based agent (HIDS) or as a network-based deployment (NIDS). IDS sensors in either deployment model typically split the network traffic and aggregate it for analysis. In conventional data center infrastructure, test access port (TAP) or other technology may be used to extract the traffic, for example at a switch or firewall, with minimal disruption to the normal flow of traffic. This allows the IDS (or other network traffic monitoring technology) connected to the TAP to receive all traffic as if it were sitting in-line, but without actually disrupting the normal flow of traffic.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for providing network traffic monitoring, for example intrusion detection, in provider networks are described. A provider network may, for example, be implemented by a service provider to provide computing resources to multiple customers or clients of the service provider. The service provider may provide one or more services on the provider network that allow the clients obtain (e.g., purchase, rent, or lease), configure, and manage resources including but not limited to computation and storage resources implemented on devices within the provider network in one or more data centers.

Figure 25:
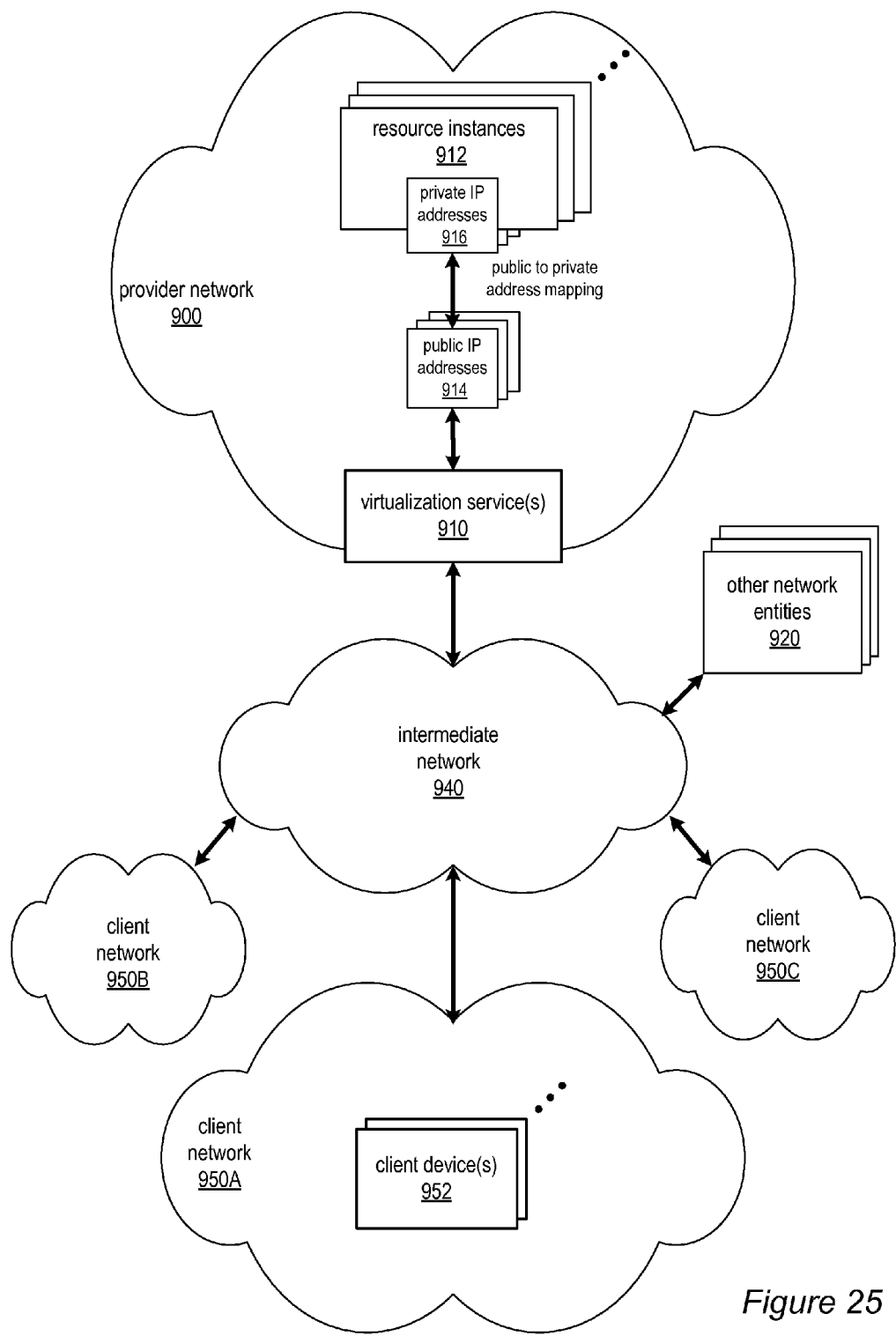
FIG. 25 illustrates an example provider network environment, according to at least some embodiments.
Figure 26:
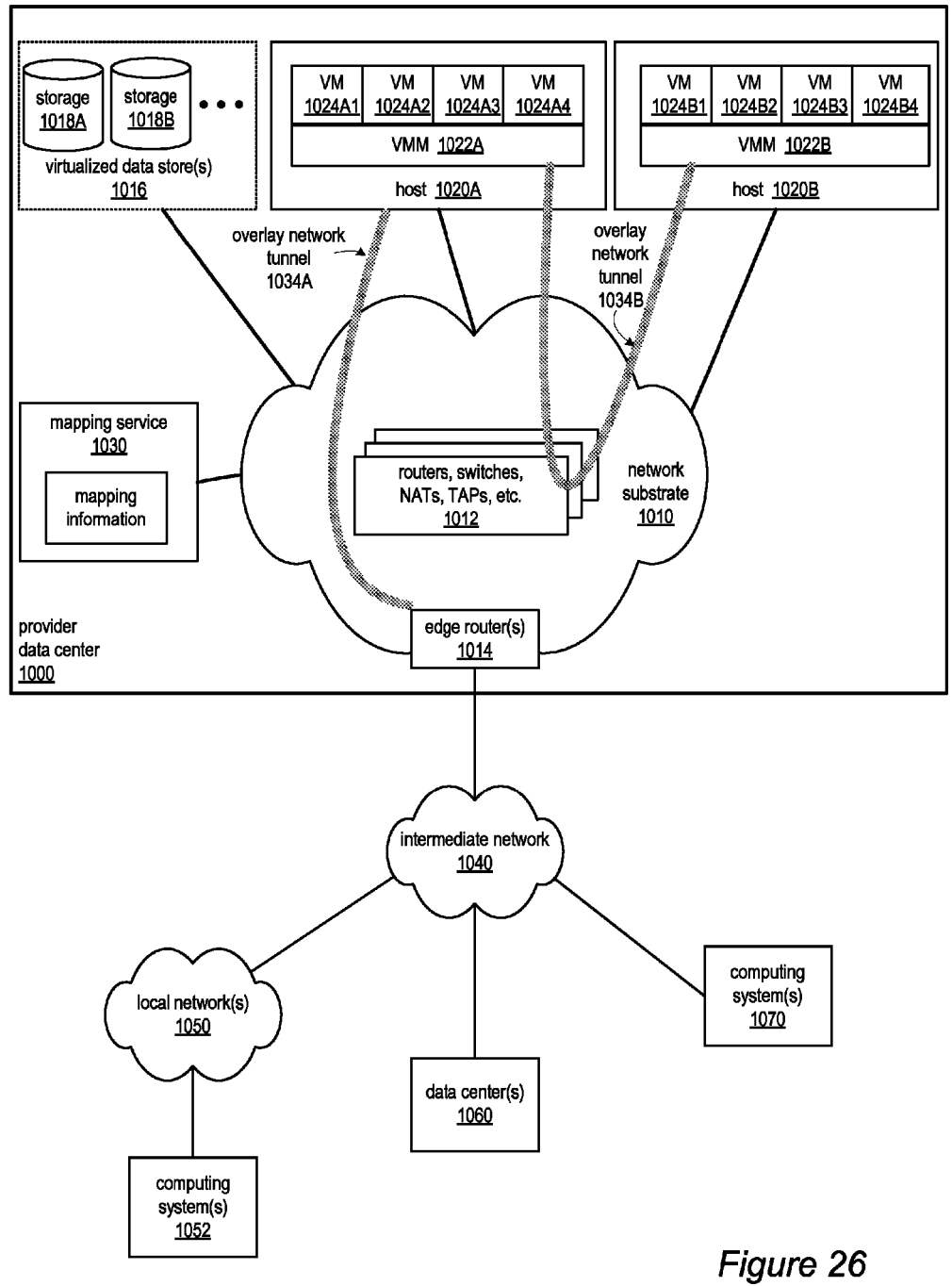
FIG. 26 illustrates an example data center that implements an overlay network on a network substrate using IP tunneling technology, according to some embodiments.

FIGS. 25 through 28 and the section titled Example provider network environments illustrate and describe example environments in which embodiments of the methods and apparatus for providing network traffic monitoring as described herein may be implemented. In at least some embodiments, at least some of the resources provided to the clients of the service provider may be virtualized computing resources implemented on multi-tenant hardware that is shared with other client(s) and/or on hardware dedicated to the particular client, as illustrated in FIGS. 25 through 28. Each virtualized computing resource (e.g., a virtual machine (VM) 1024 as shown in FIG. 26) may be referred to as a resource instance. Note, however, that in at least some provider network implementations at least some of the resources that are provided to clients may be actual physical devices such as server systems or other types of computing devices. In this document, the term "component" may be used to refer to any resource on a provider network that may be provided to a client, where "component" refers to either a virtualized computing resource (e.g., a VM) that may be configured to perform some function or to a physical resource such as a device or system that may be configured to perform some function.

Figure 1:
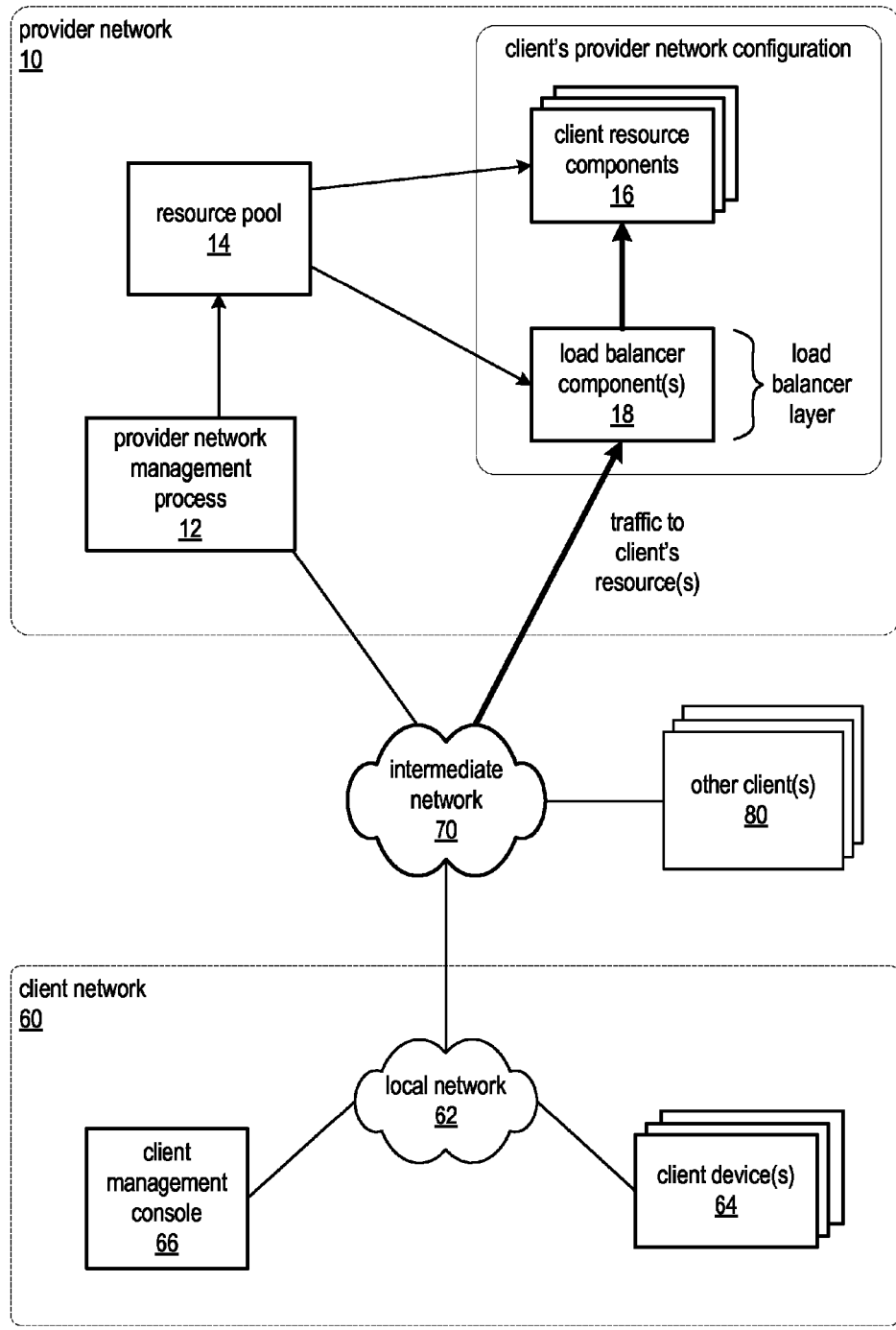
FIG. 1 illustrates an example client configuration on an example provider network implementation in which embodiments of the methods and apparatus for providing network traffic monitoring such as intrusion detection may be implemented.

FIG. 1 illustrates an example client configuration on an example provider network implementation in which embodiments of the methods and apparatus for providing network traffic monitoring may be implemented, and is not intended to be limiting. A client network 60 may couple to a provider network 10 via an intermediate network 50. Note that other client(s) 80 may also couple to the provider network 10 via the intermediate network 50. The client network 60 may include a local network 62 to which one or more client devices 64 are coupled. The client network may also include a client management console 66. The client network 60 may be operated by a client of the service provider that operates the provider network 10. The provider network 10 may include a provider network management process 12 that may be accessed from the client management console 66, for example via one or more user interfaces to the management process 12 displayable on the client management console 66. By accessing the management process 12 via the client management console 66, the client may obtain (e.g., purchase, rent, or lease), configure, and manage resource components 16, including but not limited to computation and storage resource components, on the provider network 10. In at least some embodiments, upon receiving a request for a resource component 16 from the client, the management process 12 may cause a resource component 16 to be allocated to and configured for the client on the provider network 10. In at least some embodiments, the resource component 16 may be allocated from a resource component pool 14. Note that, in at least some embodiments, resource component 16 may be provided to client(s) via one or more services on the provider network 10 such as a load balancer service. In these embodiments, the user interface(s) may include user interface(s) to the respective service, and may be provided via the management process 12 or via the respective service (e.g., via the load balancer service).

A provider network such as provider network 10 in FIG. 1 may include subnetworks, or subnets, that each includes a set of logically isolated network components. The subnets may, for example, be used to logically separate the components of virtualization services, load balancer services, appliance services, and so on from the open network. A service provider may also enable clients, including but not limited to third-party operators of various services provided on the provider network, to create virtual private networks on the service network using subnets. A private network is a set of logically separated resource components on the provider network that are allocated to a given client. In at least some embodiments, the resource components may be implemented as virtualized computing resources on multi-tenant hardware that is shared with other client(s) 80 and/or on hardware dedicated to the particular client. A private network may itself include one or more subnets. However, note that the resource components may also be or may include physical resources such as devices or systems that may be configured to perform some function. Note that clients may have resource components on the provider network that are not located in private networks. For further illustration and discussion of private networks and subnets, see FIG. 28 and the discussion thereof in the section titled Example provider network environments.

Referring again to FIG. 1, a service provider may provide, or may allow a third party to provide, load balancer technology on the provider network 10, for example via a load balancer service. For example, the client may launch some number of resource components 16 (e.g., computation resources or storage resources) in the provider network 10, and instruct the load balancer service (e.g., via provider network management process 12) to place load balancing in front of the resource components 16. One or more load balancer components 18 may then be allocated to the client and configured to provide load balancing for the resource components 16. The load balancer component(s) 18 may then distribute incoming traffic across the resource components 16 behind the load balancer component(s) 18. Note that the load balancer component(s) 18 and the resource components 16 being load balanced may be, but are not necessarily, located in a private network of the client. As the client's needs change, the load balancer technology may add or remove load balancer components 18 to automatically provide scalability (referred to as autoscaling). If a load balancer component 18 encounters performance problems or becomes unavailable, the load balancer technology may automatically redirect at least some traffic to one or more other load balancer component(s) 18, or a replacement load balancer component 18 may be allocated to the client, to thus automatically provide availability. In addition to autoscaling and availability, the load balancer technology may allow the client to manage the client's load balancer component(s) 18 (which may be referred to as a load balancer layer in the client's configuration on the provider network 10) via an interface to the load balancer service, e.g. by adding, removing, or reconfiguring load balancer component(s) 18.

Provider Networks and Intrusion Detection System (IDS) Technology

In conventional provider networks, clients typically have complete access to a guest operating system (guest OS), for example on the client's private network or subnet, but generally do not have access to the underlying network infrastructure of the provider network. As illustrated and described in relation to FIG. 26, in at least some embodiments a provider network such as provider network 10 in FIG. 1 may implement an overlay network on a network substrate, for example using IP tunneling technology. The client's configuration on the provider network 10 may operate at and only be aware of the overlay network technology; the underlying network substrate technology on which the overlay network is implemented, which may include networking devices such as routers, switches, network address translators (NATs), and so on, is generally hidden from the client. In at least some embodiments, packets in the overlay network layer may be checked against a mapping directory (e.g., provided by a mapping service as illustrated in FIG. 26) to determine what their substrate target address should be, and vice versa.

However, since in this network architecture clients generally do not have access to the underlying network infrastructure of the provider network, deployment options for intrusion detection system (IDS) technology in provider networks have conventionally been limited to host-based IDS sensor (HIDS technology) that splits inline traffic in the guest OS (i.e., at the overlay layer) and sends a copy to a centralized service. This model typically results in an additional IDS proxy layer (or intrusion detection layer) in the client's configuration on the provider network. This additional intrusion detection layer generally should be as highly available and scalable as the front end of the client's application(s) that the IDS technology is protecting. Furthermore, the addition of an intrusion detection layer results in an additional burden from a management perspective, as the client's network manager needs to configure and manage the host-based IDS component(s) in addition to the rest of the client's configuration. In addition, since the client's IDS technology is implemented as host-based IDS (HIDS) at the level of the guest OS (i.e., at the overlay layer), the underlying network infrastructure of the provider network may filter or otherwise affect at least some traffic (network packets) directed to the client's resources at the overlay layer on the provider network before the packets reach the client's intrusion detection layer. Thus, some data that is available at the underlying network infrastructure layer may not be available to the client's IDS technology implementation. Because some data may not be available to the client's IDS technology implementation, some potential security threats may go undetected.

Referring again to FIG. 1, at least some embodiments of the methods and apparatus for providing network traffic monitoring may provide a user interface to the provider network management process 12 through which a client can select network traffic monitoring such as intrusion detection as a functionality to be added to their configuration on the provider network 10, for example as part of a load balancer layer (e.g., load balancer component(s) 18) in the client's configuration on the provider network 10. The client's configuration may be, but is not necessarily, a private network configuration. For example user interfaces that may be used in at least some embodiments see FIGS. 10 through 12. Thus, in at least some embodiments, there may be no intrusion detection components and no intrusion detection layer for the client to separately manage. In at least some embodiments, the client may be unaware of how intrusion detection is actually implemented for the client on the provider network 10. The client may simply select, for example via a user interface, that they want network traffic monitoring such as intrusion detection functionality to be added to the client's configuration on the provider network 10, for example at a load balancer component 18 or at a load balancer layer. In response, the provider network management process 12 may cause network traffic monitoring such as intrusion detection to be implemented on or at one or more components or at a layer.

To add network traffic monitoring such as intrusion detection, at least some embodiments may allow the client to easily add network traffic monitoring at a component or components (e.g., at load balancer component(s)) simply by indicating that the client wants network traffic monitoring to be performed at the component(s) when configuring the component(s) via a user interface provided by the service provider. In at least some embodiments, network traffic monitoring (e.g., intrusion detection) may be added when the client is adding a new component or (re)configuring an existing component in the client's configuration on the provider network.

To implement network traffic monitoring such as intrusion detection for a client configuration, the provider network management process 12 may configure the network traffic monitoring inline with the data stream to the client's configuration or out-of-band. In inline network traffic monitoring, the provider network management process 12 configures one or more components on the provider network to route the data stream through at least one component that implements network traffic monitoring technology. In out-of-band network traffic monitoring, the provider network management process 12 configures one or more components on the provider network to replicate the data stream to an out-of-band device or devices that implement network traffic monitoring technology. In at least some embodiments, in either case, the provider network may handle the configuration and the routing of the data stream to the device or component that performs network traffic monitoring. The client only has to specify that network traffic monitoring is to be performed at one or more components. The provider network management process 12 performs the configuration, and the provider network facilitates the routing of the data stream according to the configuration. From the client's perspective, this may all be hidden. The client may only be aware that network traffic monitoring is being performed; the configuration and routing that accomplishes the network traffic monitoring may be handled for the client by the provider network, and thus may not be visible to the client.

Figure 10:
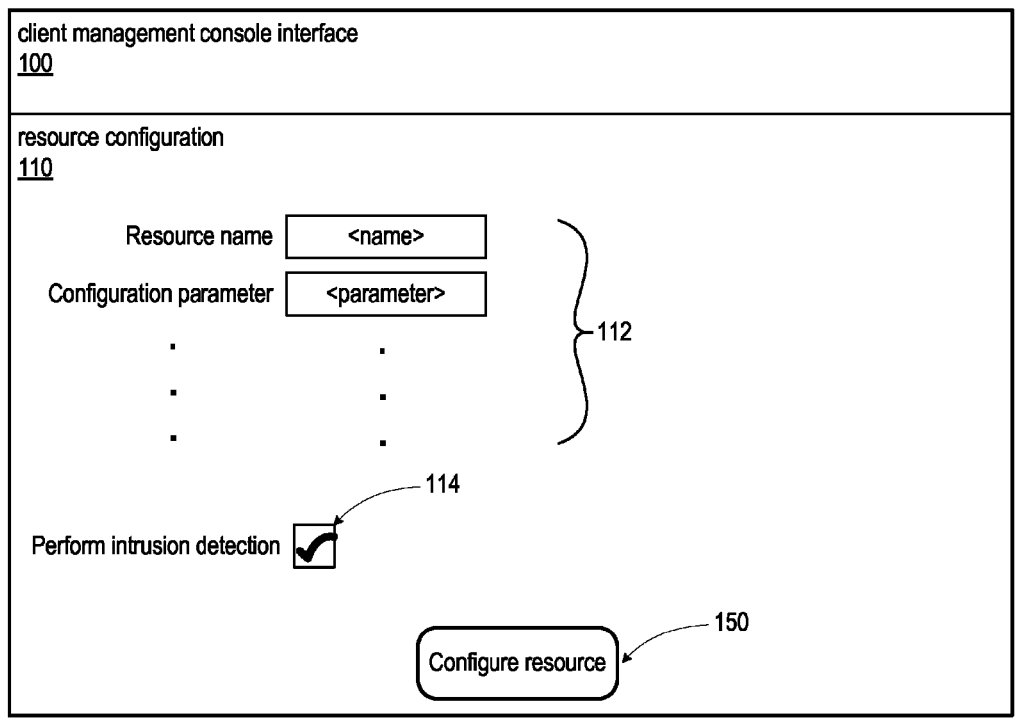
FIGS. 10 through 12 illustrate example user interfaces that may be used in embodiments of the methods and apparatus for providing network traffic monitoring such as intrusion detection, according to at least some embodiments.
Figure 11:
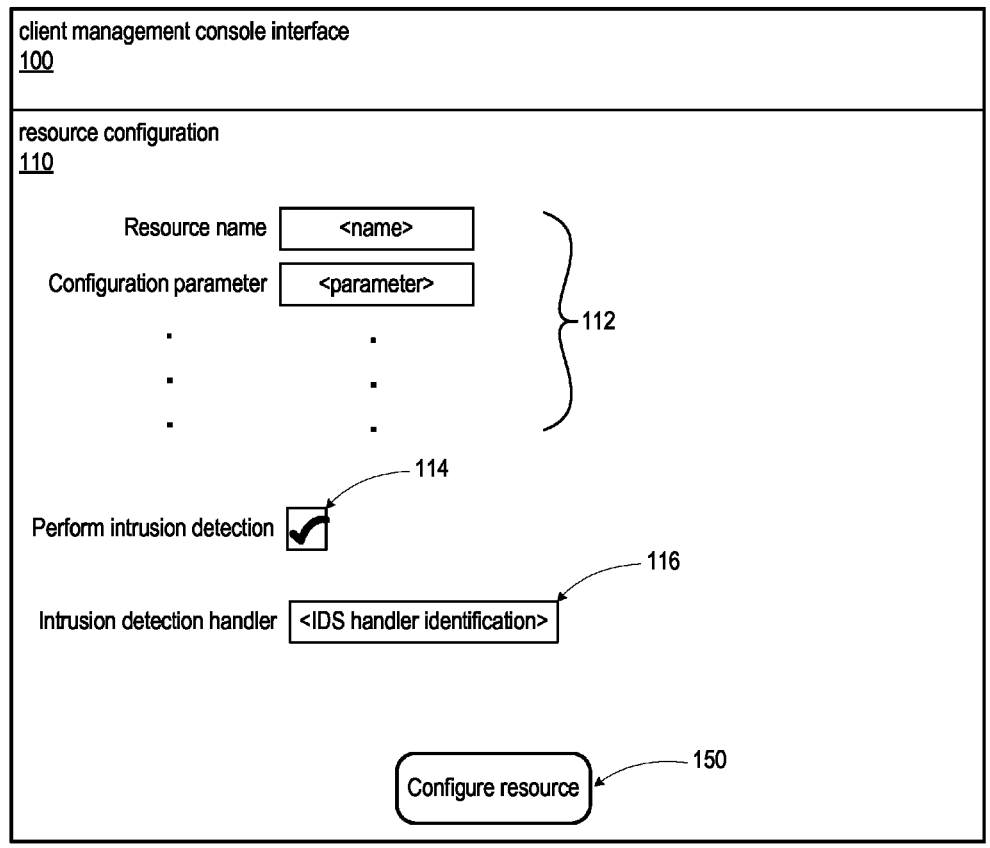
Figure 12:
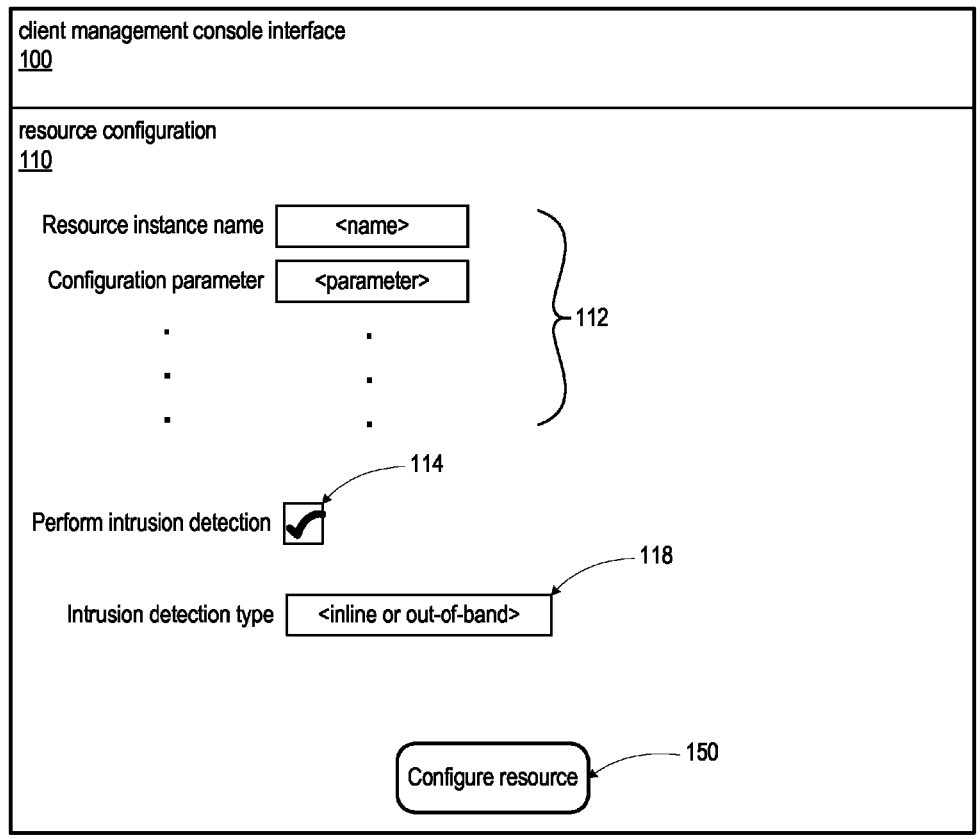

FIGS. 10 through 12 illustrate example user interfaces that may be used in embodiments of the methods and apparatus for providing network traffic monitoring, according to at least some embodiments. As shown in FIG. 10, a client management console interface 100 may be provided that allows the client to access a provider network process such as management process 12 of FIG. 1. The client management console interface 100 may, for example, be displayed on a client management console 66 in the client network 60, as shown in FIG. 1. However, in at least some embodiments, interface 100 may be displayed on any device via which a client or client's representative may access the provider network.

Via interface 100, the client or client's representative may access a resource configuration interface 110. The resource configuration interface 110 may include one or more user interface elements 112 via which the user can specify various parameters of or preferences for new resource component(s) that the user wishes to add to the client's configuration on the provider network, or via which the user can change the configuration for existing resource component(s) in the client's configuration. The parameters or preferences may, for example, include a resource name, type, capacity, or in general any parameter or preference that may apply to the given resource type. The resource component(s) being added or configured may be, but is not necessarily, load balancer component(s) as described herein. The resource configuration interface 110 may also include a checkbox 114 or other user interface element as shown in FIG. 10 that the user may select to specify that the client wants intrusion detection performed at the resource component being configured. The resource configuration interface 110 may also include a "configure resource" user interface element 150 as shown in FIG. 10 that the user may select to apply the specified configuration for the resource component(s) to the client's configuration on the provider network. Upon selecting the "configure resource" user interface element 150, the resource component(s) may be added to and/or configured in the client's configuration. If the user has specified that the client wants intrusion detection performed at the resource component(s), intrusion detection technology may also be automatically added to and/or configured at the resource instance(s).

FIGS. 11 and 12 illustrate that resource configuration interface 110 may also include other user interface elements via which the client can specify a configuration for intrusion detection, if element 114 is selected to implement intrusion detection at the respective resource component(s). In FIG. 11, a user interface element 116 is shown via which the client can specify an intrusion detection handler to which a copy of the client's network traffic will be sent in out-of-band intrusion detection implementations. In FIG. 12, a user interface element 118 is shown via which the client can select either an inline or an out-of-band implementation when setting up intrusion detection. Note that embodiments may provide other user interface elements via which the client can select or specify other attributes of intrusion detection, for example a particular IDS that the client wants to use in either inline or out-of-band implementations.

Figure 13:
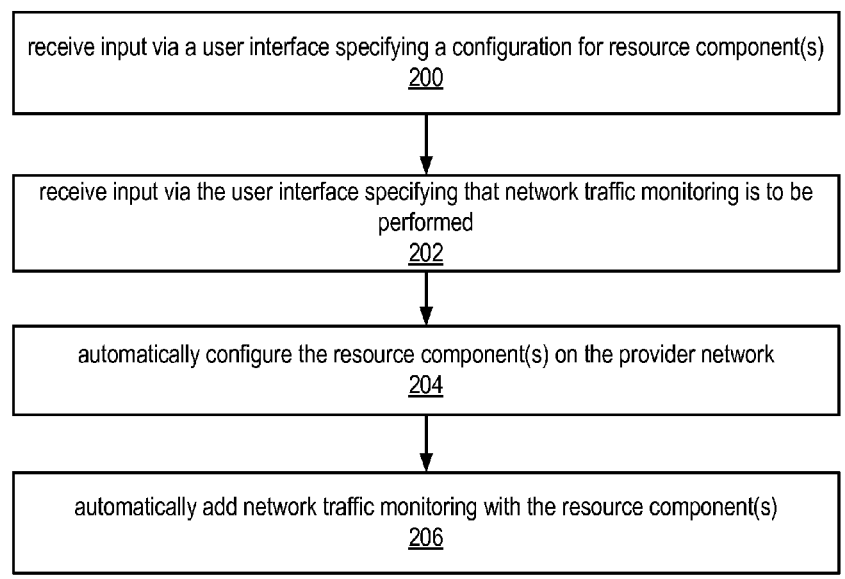
FIG. 13 illustrates a high-level method for adding intrusion detection to a resource component or layer of a client's configuration via a user interface, according to at least some embodiments.

FIG. 13 illustrates a high-level method for adding network traffic monitoring such as intrusion detection to a resource component or layer of a client's configuration via a user interface, according to at least some embodiments. A user interface for adding or configuring resource component(s) may be displayed, for example on a client management console 66 as shown in FIG. 1. For example user interfaces that may be used in at least some embodiments see FIGS. 10 through 12. The provider network, e.g. a provider network management process 12 as shown in FIG. 1, may receive input via the user interface specifying or changing a configuration for resource component(s), as indicated at 200 of FIG. 13. As indicated at 202, additional input may be received via the user interface specifying that network traffic monitoring (e.g., intrusion detection) is to be performed at the resource component(s). For example, the client may select a checkbox 114 or other user interface element as shown in FIGS. 10 through 12 to specify that the client wants network traffic monitoring performed for the resource component(s). Input may be received indicating that the client wants to implement or configure the resource component(s) according to the settings on the user interface; for example, the client may select a "configure resource" user interface element 150 as shown in FIGS. 10 through 12. In response, the provider network, e.g. via a provider network management process 12 as shown in FIG. 1, may cause the resource component(s) to be automatically configured on the provider network, as indicated at 204. If this is a new resource component(s), the resource component(s) may be allocated out of a resource pool as shown in FIG. 1. As indicated at 206, the provider network, e.g. via a provider network management process 12 as shown in FIG. 1, may also cause network traffic monitoring to be automatically configured and implemented on or at the resource component(s). The network traffic monitoring may be implemented in any of several ways including inline and out-of-band implementations as described herein.

Since network traffic monitoring such as intrusion detection may be added as an option on other resource components on the provider network (e.g., at load balancer component(s)), in at least some embodiments there may be no network traffic monitoring component(s) for the client to separately manage, and no separate network traffic monitoring layer added to the client's configuration on the provider network. In at least some embodiments, the client simply specifies that network traffic monitoring (e.g., intrusion detection) is to be performed when configuring a resource such as a load balancer, and network traffic monitoring is automatically added at the resource component(s). In some embodiments, however, the client may be allowed to specify a particular configuration for network traffic monitoring, for example to select either inline network traffic monitoring or out-of-band network traffic monitoring according to the client's preferences (see, e.g., FIG. 12), and/or to select or specify particular network traffic monitoring technology, such as a particular intrusion detection system (IDS) and/or network traffic monitoring handler (e.g., intrusion detection handler) that the client wants to use (see, e.g., FIG. 11).

In addition, at least some embodiments of the methods and apparatus for providing network traffic monitoring may add network traffic monitoring technology such as intrusion detection technology at a layer in the client's configuration on the provider network (e.g., at the load balancer layer) that already provides availability, autoscaling, and/or other benefits to the client's resources via the layer implementation. For example, as shown in FIG. 1, the service provider may provide load balancer technology via which the client can add a load balancer layer to the client's configuration on the provider network, and that provides availability, autoscaling, management, and/or other benefits to the client at the load balancer layer. By adding network traffic monitoring such as intrusion detection at a layer such as the load balancer layer, the client may automatically gain the benefits and features of the layer to which network traffic monitoring is added without the complexity of adding and managing a separate network traffic monitoring layer or separate network traffic monitoring components.

In addition, embodiments of the methods and apparatus for providing network traffic monitoring may add network traffic monitoring technology such as intrusion detection technology at the underlying network infrastructure layer, or at locations in the client's configuration on the provider network (e.g., at a load balancer component) at which the network packets at the underlying network infrastructure are accessible to the intrusion detection technology. Thus, using embodiments, data related to the client's network traffic that is available at the underlying network infrastructure layer but not to host systems at the level of the client's guest OS (i.e., at the overlay layer) may be made available to the client's network traffic monitoring (e.g., intrusion detection) implementation. For example, using embodiments, an intrusion detection implementation for the client's configuration on the provider network may be able to detect security threats that may not be detected by conventional host-based intrusion detection implementations on a provider network.

While embodiments are primarily described herein in relation to providing intrusion detection to clients on a provider network, the methods and apparatus described herein can also be applied to provide various other network traffic monitoring or traffic inspection functions or services to clients. Examples of other traffic monitoring and inspection functions or services may include, but are not limited to, intrusion prevention system (IPS) technology, data loss prevention (DLP), various network analytics or traffic analysis functions, network forensics data collection services, and so on. For example, embodiments may be configured to provide DLP for a database or data storage implementation on a client's configuration. Furthermore, while embodiments are generally described in which network traffic monitoring (e.g., intrusion detection) is applied to network traffic directed to a client configuration, the methods and apparatus described herein may be adapted to monitor network traffic in either or both directions. For example, replication technology such as test access port (TAP) technology may be applied to traffic going to and coming from a client configuration, resource component, or any other device or virtual resource instance on a provider network.

Intrusion Prevention System (IPS) Technology

As mentioned above, while embodiments are primarily described herein in relation to providing intrusion detection to clients on a provider network, the methods and apparatus can also be applied to provide other network traffic monitoring or traffic inspection functions or services to clients. One example is intrusion prevention system (IPS) technology. In an embodiment that implements IPS technology, in addition to monitoring for and reporting on intrusion detection as in IDS technology, one or more specified policies may be enforced by the component(s) that implement IPS technology upon detecting an intrusion attempt. For example, in an inline IPS implementation, if an inline IPS component detects an intrusion attempt according to one or more criteria, the IPS component may be configured to block or stop forwarding at least some packets to a downstream component (e.g., a load balancer component or some other client resource component). As another example, in an out-of-band IPS implementation, if an out-of-band IPS handler detects an intrusion attempt according to one or more criteria, the IPS handler may be configured to automatically direct a configuration change so that the traffic flow to the client's resources is stopped or routed somewhere else. For example, the IPS handler may notify the replication technology, which may stop sending a copy of the data to the downstream client resources. In both cases, the IPS implementation may be configured to resume traffic flow to the client resource once the intrusion attempt stops or is otherwise resolved.

Inline and Out-of-Band Implementations

As described above, at least some embodiments may provide a user interface through which a client can select network traffic monitoring such as intrusion detection as a functionality to be added to their provider network implementation, for example as part of a load balancer layer in the client's configuration. In at least some embodiments, the client may be unaware of how the network traffic monitoring is actually implemented for the client on the provider network. The client may simply select, via the user interface, that they want network traffic monitoring functionality to be added at a set of resource components, for example at load balancer component(s) or at a load balancer layer.

Figure 2A:
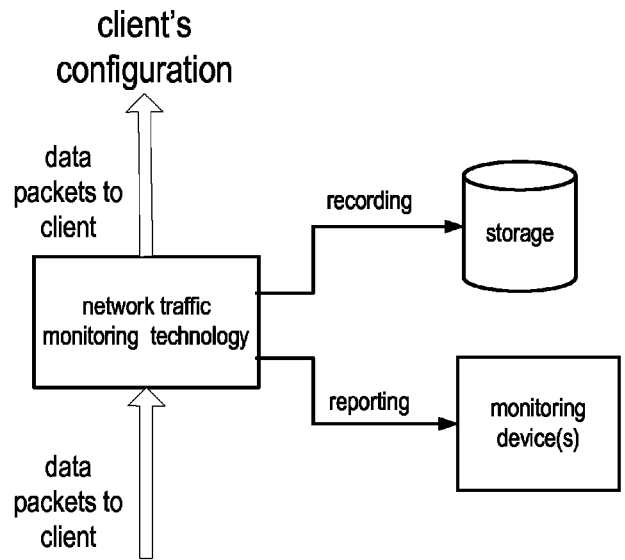
FIG. 2A illustrates inline network traffic monitoring, according to at least some embodiments.

Some embodiments may implement network traffic monitoring (e.g., intrusion detection) on the provider network as inline network traffic monitoring, as illustrated in FIG. 2A. In inline network traffic monitoring, network traffic monitoring technology is implemented inline in a data path to the client's configuration. The data path passes through the network traffic monitoring technology (e.g., an intrusion detection system (IDS) implementation). Network traffic monitoring technology may either be implemented on resource component(s) in the client's configuration along with other functionality (e.g., on load balancer component(s) along with load balancer technology) or on separate appliances or resource component(s) in front of or behind resource component(s) that are in the client's configuration (e.g., on separate resource component(s) in front of or behind load balancer component(s)). In either case, the network traffic monitoring implementation has access to data packets at a lower level of the provider network substrate than the level at which the client's configuration operates (e.g., at the level of the underlying network substrate technology on which an overlay network is implemented as illustrated in FIG. 26).

Figure 2B:
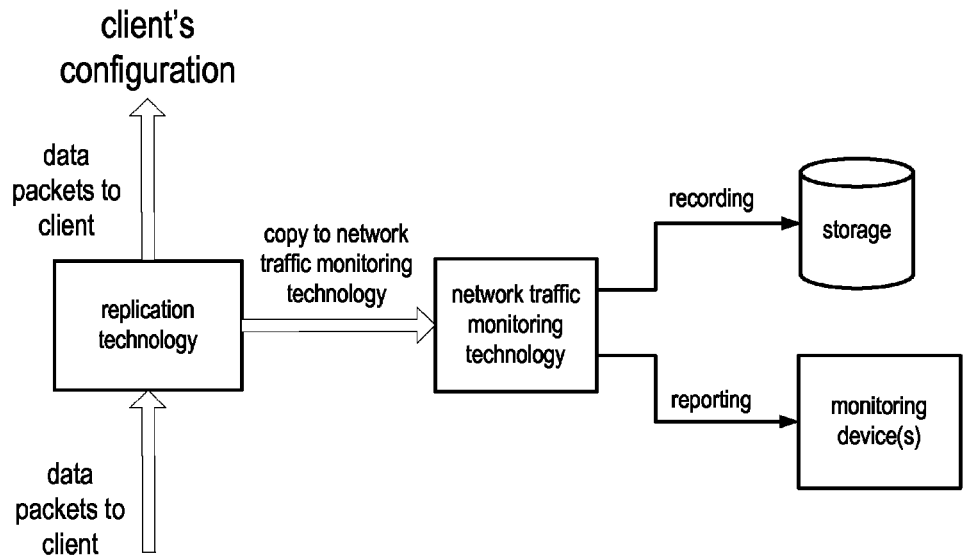
FIG. 2B illustrates out-of-band network traffic monitoring, according to at least some embodiments.

Other embodiments may implement network traffic monitoring technology (e.g., intrusion detection) on the provider network as out-of band network traffic monitoring, as illustrated in FIG. 2B. In out-of-band network traffic monitoring technology, the data sent to the client is copied by replication technology (e.g., test access port (TAP) technology, port mirroring technology, or some other technology) implemented on the provider network (e.g., at the level of the underlying network substrate technology as illustrated in FIG. 26). The replication technology creates a copy of data packets directed to the client's configuration on the provider network, sends the data packets on to the client destination(s), and sends the copy of the packets to network traffic monitoring technology (e.g., intrusion detection system (IDS) technology).

The network traffic monitoring technology implementation to which the copy of the data packets is sent may be located on the provider network. For example, the network traffic monitoring technology implementation may be a network traffic monitoring appliance or service (e.g., an IDS appliance or service) on the provider network provided by the service provider or by a third party. Alternatively, the network traffic monitoring technology implementation may be located on a resource component of the client's configuration on the provider network. In this example, the client may implement and manage network traffic monitoring technology on a resource component provided by the service provider.

Alternatively, the network traffic monitoring technology implementation to which the copy of the data packets is sent may be at some location external to the provider network, for example a network traffic monitoring appliance (e.g., an IDS appliance) located in the client's external network (e.g., client network 60 of FIG. 1) or at some other external network location such as a local network of a third party that provides network traffic monitoring services.

Yet other embodiments may optionally implement network traffic monitoring as either inline or out-of-band network traffic monitoring, for example according to the client's preference (see, e.g., FIG. 12). In an inline implementation, if the network traffic monitoring technology goes down for some reason, the data stream to the client may be interrupted, and thus the client's resources behind the intrusion detection implementation may never go unprotected. Some clients may prefer inline network traffic monitoring for at least this reason. Conversely, in an out-of-band implementation, since the data stream is copied by replication technology to network traffic monitoring technology implemented out-of-band from the data stream to the client's resources, if the network traffic monitoring technology goes down for some reason, the client's resources may continue to receive the data stream copy from the replication technology with no interruption. Thus, the client's resources may be unprotected while the network traffic monitoring technology is down in the out-of-band implementations, but are still receiving data packets. However, some clients may prefer out-of-band network traffic monitoring for at least this reason. In at least some embodiments, the client may select either an inline or an out-of-band implementation via a user interface when setting up network traffic monitoring, for example when adding or configuring load balancer component(s) 18 in the load balancer layer. See, e.g., user interface element 118 of FIG. 12.

In both the inline and the out-of-band implementations, the implementation details may be transparent to the client. However, at least some embodiments may allow the client, via the user interface, to specify configuration details of a particular network traffic monitoring implementation, for example a target address of the network traffic monitoring technology to which the data copy as illustrated in FIG. 2B, a particular intrusion detection system (IDS) technology or other network traffic monitoring technology that the client wants to use in either inline or out-of-band implementations, and/or indications of destinations for reporting and recording as illustrated in FIGS. 2A and 2B.

The network traffic monitoring technology may generate output including but not limited to record data (e.g., records of detected incidents, network traffic metrics, or in general any data or information related to network traffic monitoring including but not limited to intrusion detection that a client may desire to have stored) and report data (e.g., incident alerts, status reports, performance metrics, or in general any data or information related to network traffic monitoring that a client may desire to have reported). As shown in FIGS. 2A and 2B, in at least some embodiments, in the inline and the out-of-band implementations, the network traffic monitoring technology may record information to a storage and report information to a monitoring device or devices. The storage may, for example, be virtualized storage on the provider network provided to the client via a storage service of the provider network (see, e.g., FIGS. 23 through 25). The monitoring device(s) may, for example, be one or more resource components in the client's configuration on the provider network and/or one or more monitoring devices or consoles on the client's external network (e.g., client management console 66 on client network 60 of FIG. 1).

Example Inline Implementations

Figure 3:
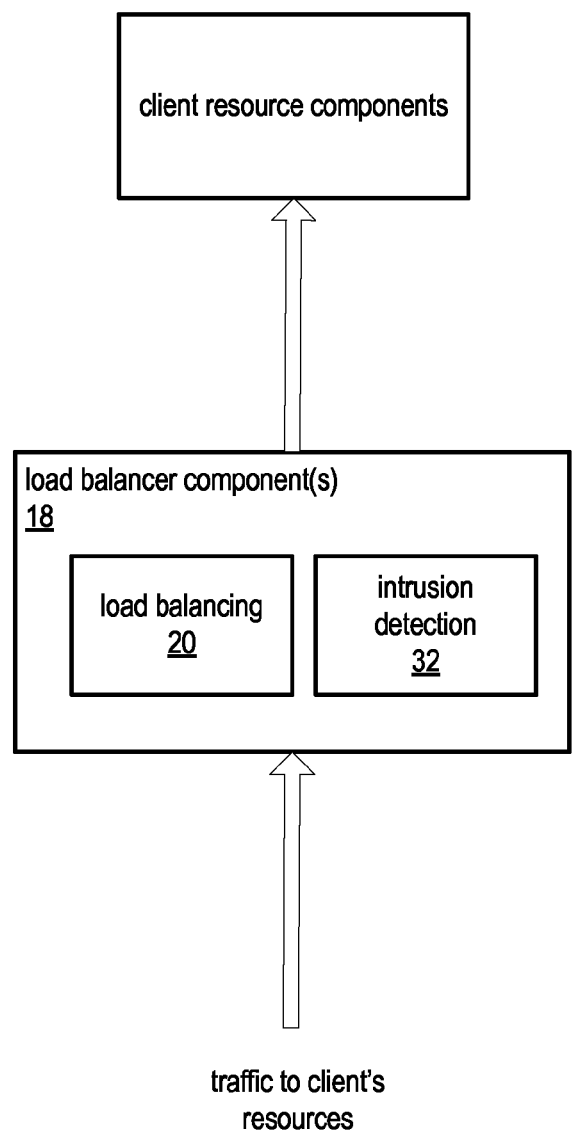
FIG. 3 illustrates an example inline implementation of intrusion detection in which intrusion detection technology is implemented at the load balancer layer on the same resource component(s) as the load balancer technology, according to at least some embodiments.
Figure 4:
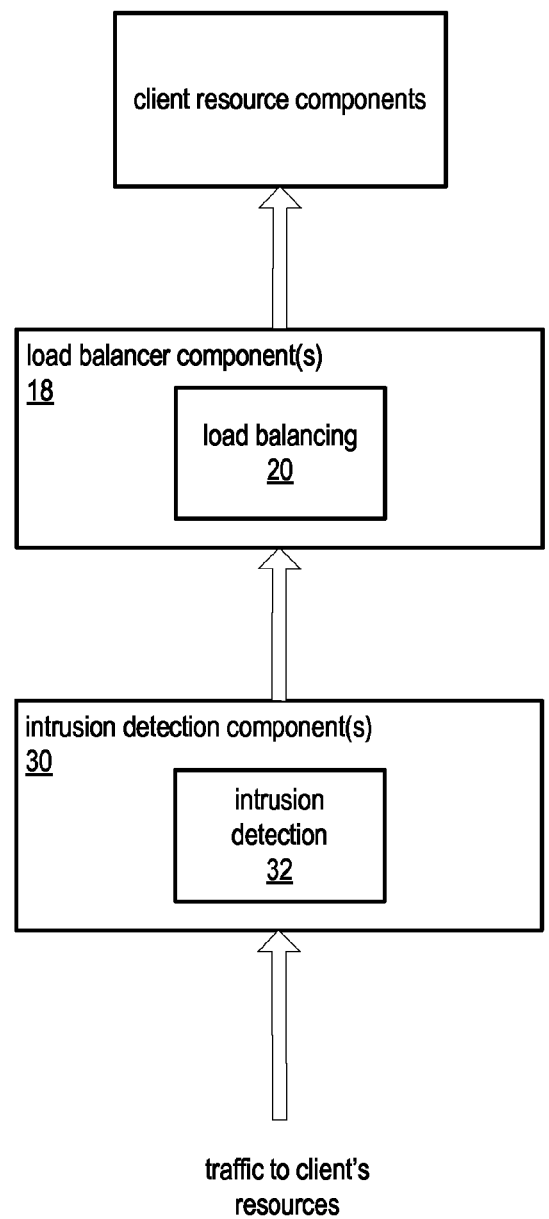
FIG. 4 illustrates an example inline implementation of intrusion detection in which intrusion detection technology is implemented on separate resource component(s) upstream of the load balancer component(s), according to at least some embodiments.
Figure 5:
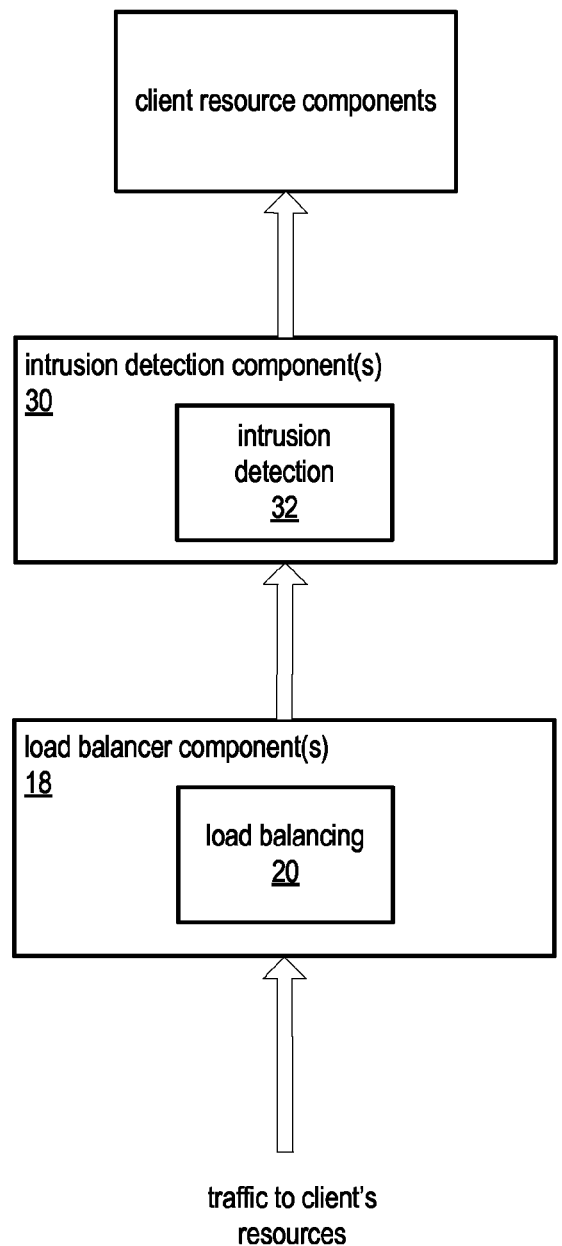
FIG. 5 illustrates an example inline implementation of intrusion detection in which intrusion detection technology is implemented on separate resource component(s) downstream of the load balancer component(s), according to at least some embodiments.
Figure 14:
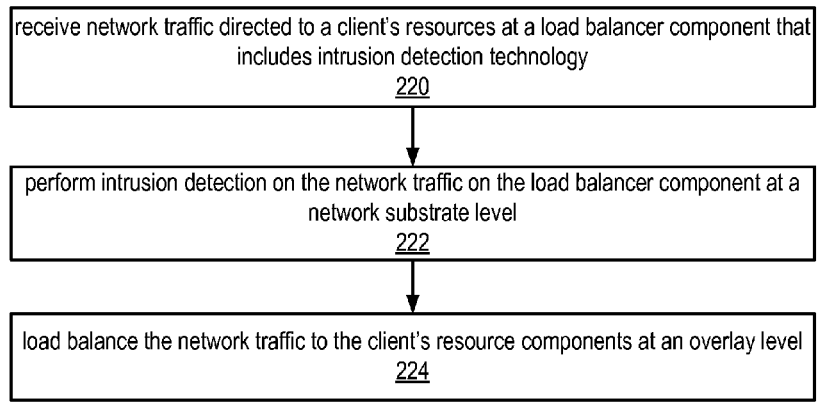
FIG. 14 illustrates an example inline intrusion detection method in which intrusion detection technology is implemented at the load balancer layer on the same resource component(s) as the load balancer technology, according to at least some embodiments.
Figure 15:
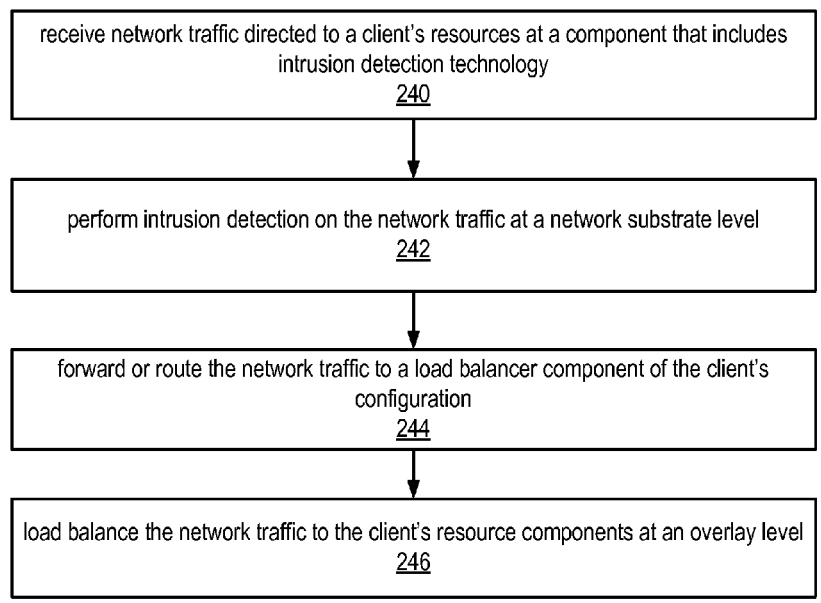
FIG. 15 illustrates an example inline intrusion detection method in which intrusion detection technology is implemented on separate resource component(s) upstream of the load balancer component(s), according to at least some embodiments.
Figure 16:
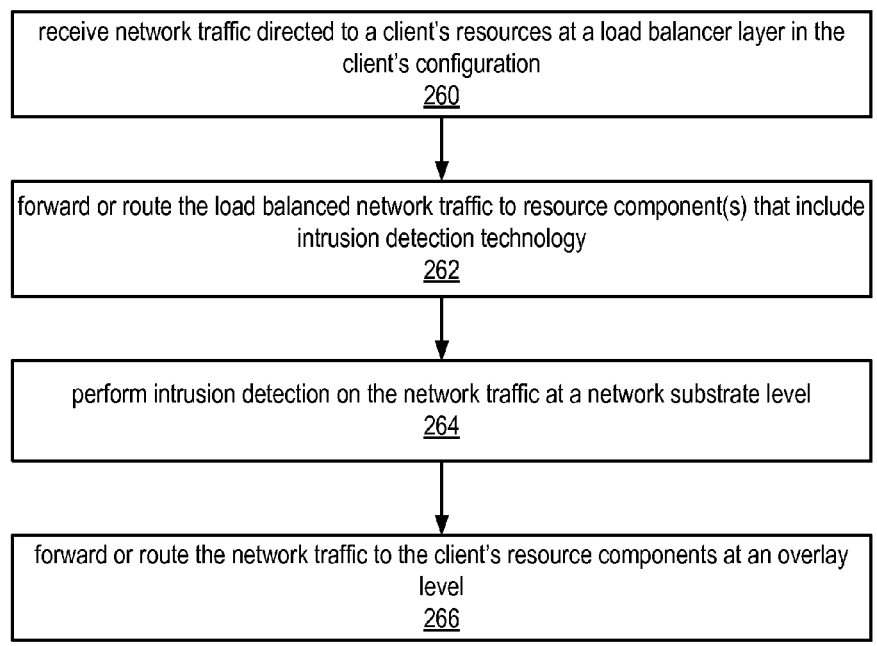
FIG. 16 illustrates an example inline intrusion detection method in which intrusion detection technology is implemented on separate resource component(s) downstream of the load balancer component(s), according to at least some embodiments.

FIGS. 3 through 5 illustrate example inline implementations of network traffic monitoring, specifically intrusion detection, according to at least some embodiments, and are not intended to be limiting. FIGS. 14 through 16 are high-level flowcharts of the inline intrusion detect methods as illustrated in FIGS. 3 through 5, according to at least some embodiments. Note that intrusion detection is used by way of example, and is not intended to be limiting. Other types of network traffic monitoring than intrusion detection may be similarly implemented.

FIG. 3 illustrates an example inline implementation of intrusion detection in which intrusion detection technology is implemented at the load balancer layer on the same resource component(s) as the load balancer technology, according to at least some embodiments. In this implementation, a load balancer component 18 implements and performs both load balancing 20 and intrusion detection 32. The client, however, just sees and manages load balancer component(s) 18 in the load balancer layer. In at least some embodiments, to implement intrusion detection in this implementation, the clients selects "Perform intrusion detection" on a user interface when adding or configuring load balancer component(s) 18 in the load balancer layer (see, e.g., FIGS. 10 through 12). Functionality (e.g., autoscaling, availability, etc.) of the load balancer layer applies to the intrusion detection implementation. In this implementation, there may be no new network hops, layers, or resource components added to the client's configuration, since intrusion detection is implemented at new or existing load balancer resource components in a load balancer layer.

FIG. 14 illustrates an example inline intrusion detection method in which intrusion detection technology is implemented at the load balancer layer on the same resource component(s) as the load balancer technology, according to at least some embodiments. As indicated at 220, network traffic directed to a client's resources is received at a load balancer component that includes intrusion detection technology. As indicated at 222, the intrusion detection technology performs intrusion detection on the network traffic on the load balancer component at a network substrate level. As indicated at 224, the load balancer technology then load balances the network traffic to the client's resource components at an overlay level.

Note that load balancer component(s) and the load balancer layer are given as examples of a location in the client's configuration on the provider network at which intrusion detection may be implemented. At least some embodiments may implement intrusion detection, or may allow intrusion detection to be implemented, on or at other types of resource components or at other layers in the client's configuration.

FIGS. 4 and 5 illustrate example inline implementation of intrusion detection in which intrusion detection technology is implemented inline with the load balancer components but on separate resource components than the load balancer components, according to at least some embodiments. In these implementations, one or more resource components may be allocated as intrusion detection component(s) 30 that implement intrusion detection 32. The intrusion detection component(s) 30 may be either in front of (upstream of) the load balancer component(s) 18 that implement load balancing 20, as shown in FIG. 4, or behind (downstream of) the load balancer component(s) 18, as shown in FIG. 5. In these implementations, there is an additional network hop or layer added to the client's configuration.

In at least some embodiments, in both the upstream and downstream inline implementations shown in FIGS. 4 and 5, the client may be agnostic to the intrusion detect layer and may not need to separately manage the intrusion detection layer or intrusion detection component(s) 30. The client just sees and manages load balancer component(s) 18 in the load balancer layer. In at least some embodiments, to implement intrusion detection in the implementations shown in FIGS. 4 and 5, the clients selects "Perform intrusion detection" on a user interface when adding or configuring load balancer component(s) 18 in the load balancer layer (see, e.g., FIGS. 10 through 12). Functionality (e.g., autoscaling, availability, etc.) of the intrusion detection layer may be automatically provided and may be similar to that provided for the load balancer layer.

In a downstream implementation as shown in FIG. 5, the client's traffic may be forwarded by a load balancer component 18 to an intrusion detection component 30 instead of to client resource component(s); the intrusion detection component 30 then forwards the traffic to client resource component(s). Alternatively, the load balancer component 18 may forward the traffic to client resource component(s); however, the provider network infrastructure (see, e.g., FIG. 26) may route the traffic from the load balancer component 18 to an intrusion detection component 30. In this second case, the load balancer component 18 may not need to be aware that the traffic is being routed to an intrusion detection component 30. The provider network infrastructure may also handle routing of the traffic from the intrusion detection component 30 to client resource components. In this case, from the perspective of the client resource components, the traffic may appear to be coming from the load balancer component 18.

In at least some embodiments, in an upstream implementation as shown in FIG. 4, the provider network infrastructure (see, e.g., FIG. 26) may handle routing of the traffic to the intrusion detection component(s) 30, and/or routing of the traffic from the intrusion detection component(s) 30 to the load balancer component(s) 18.

FIG. 15 illustrates an example inline intrusion detection method in which intrusion detection technology is implemented on separate resource component(s) upstream of the load balancer component(s), according to at least some embodiments. As indicated at 240, network traffic directed to a client's resources is received at a resource component that includes intrusion detection technology. As indicated at 242, intrusion detection is performed on the network traffic at a network substrate level. As indicated at 244, the network traffic is forwarded or routed to a load balancer component of the client's configuration. As indicated at 246, the load balancer component load balances the network traffic to the client's resource components at an overlay level.

FIG. 16 illustrates an example inline intrusion detection method in which intrusion detection technology is implemented on separate resource component(s) downstream of the load balancer component(s), according to at least some embodiments. As indicated at 260, network traffic directed to a client's resources is received at a load balancer layer in the client's configuration. As indicated at 262, the load balancer component(s) forward or route the load balanced network traffic to resource component(s) that include intrusion detection technology. As indicated at 264, intrusion detection is performed on the network traffic at a network substrate level. As indicated at 266, the network traffic is forwarded or routed to the client's resource components at an overlay level.

Example Out-of-Band Implementations

Figure 6:
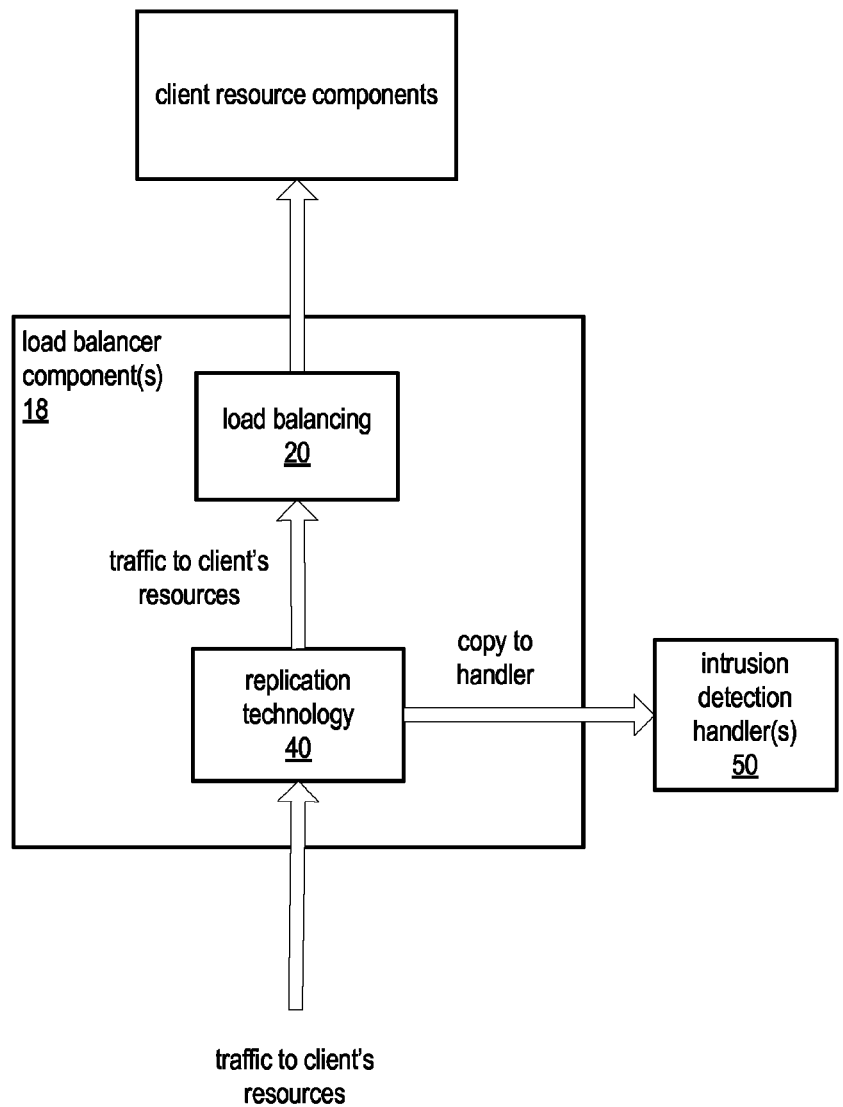
FIG. 6 illustrates an example out-of-band implementation of intrusion detection in which replication technology is implemented on or at the load balancer component(s), according to at least some embodiments.
Figure 7:
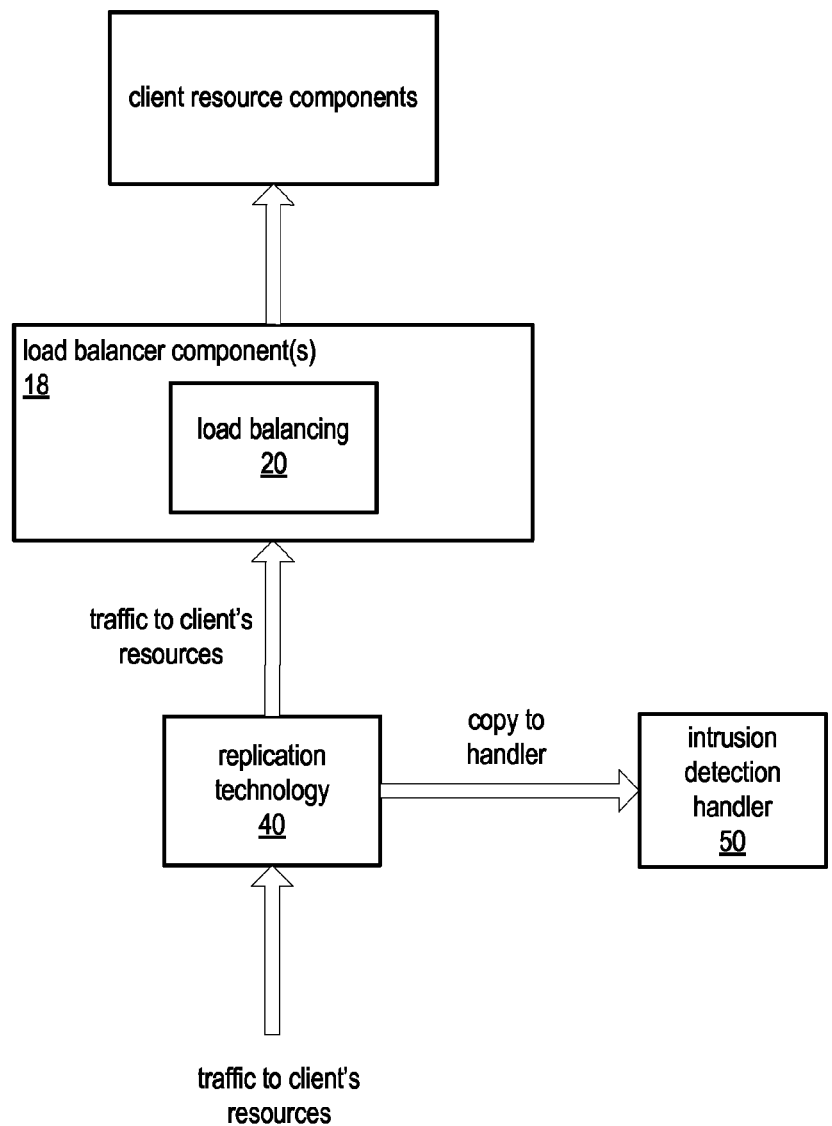
FIG. 7 illustrates an example out-of-band implementation of intrusion detection in which replication technology is implemented in front of (upstream of) the load balancer component(s), according to at least some embodiments.
Figure 8:
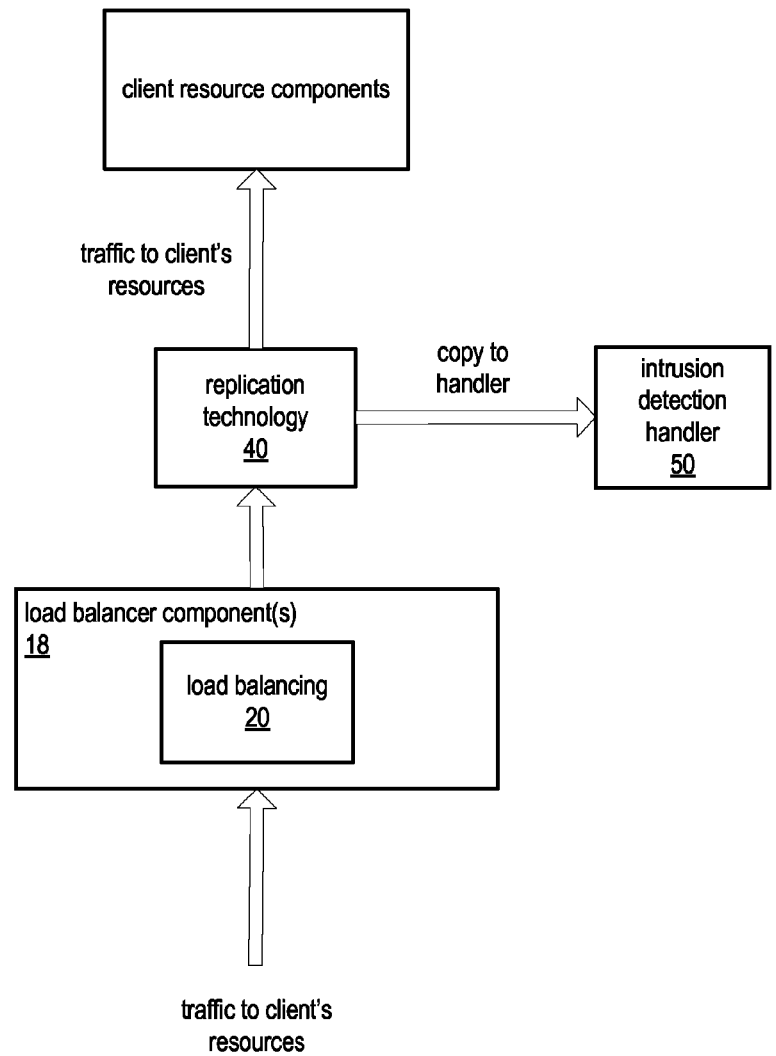
FIG. 8 illustrates an example out-of-band implementation of intrusion detection in which replication technology is implemented behind (downstream of) the load balancer component(s), according to at least some embodiments.
Figure 17:
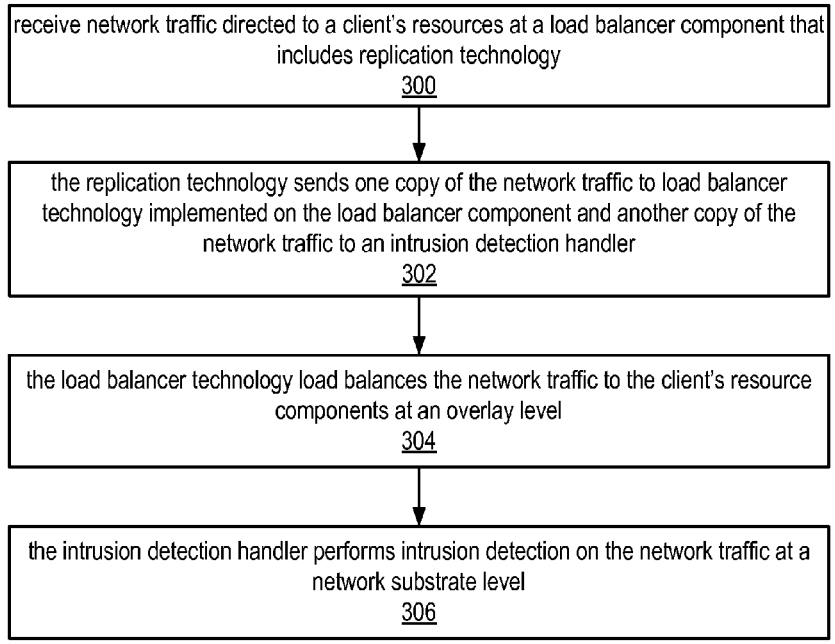
FIG. 17 illustrates an example out-of-band intrusion detection method in which replication technology is implemented on or at the load balancer component(s), according to at least some embodiments.
Figure 18:
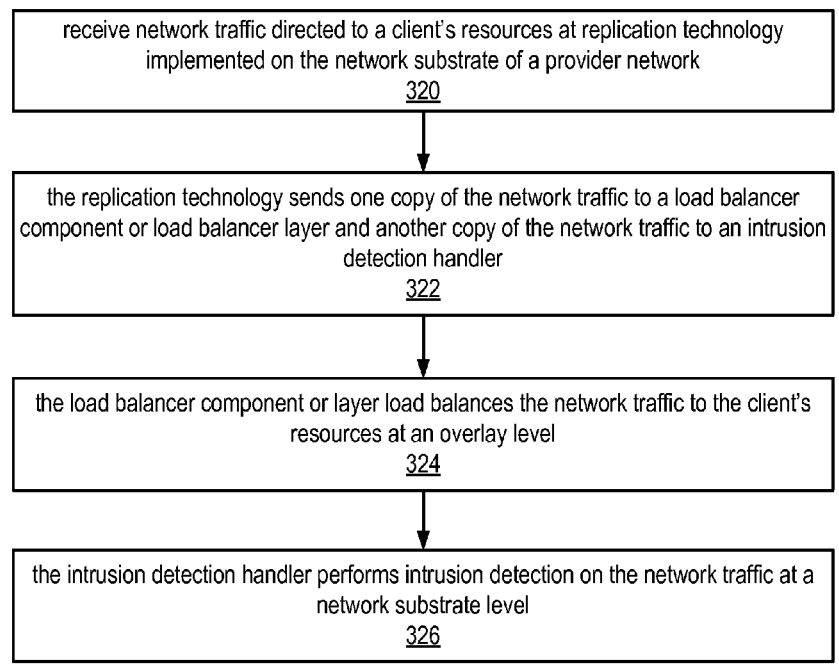
FIG. 18 illustrates an example out-of-band intrusion detection method in which replication technology is implemented in front of (upstream of) the load balancer component(s), according to at least some embodiments.
Figure 19:
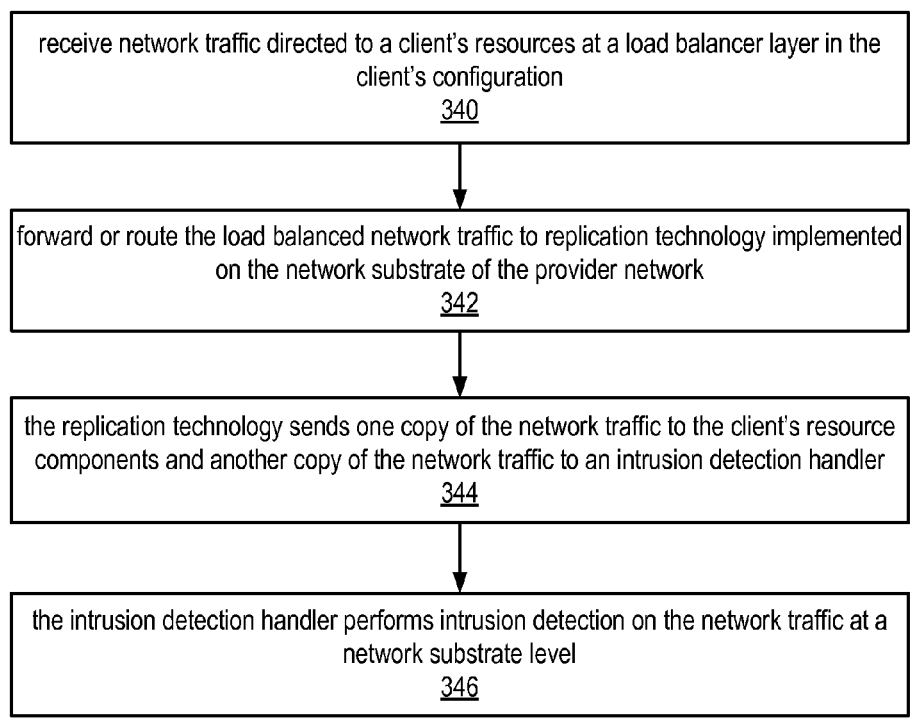
FIG. 19 illustrates an example out-of-band intrusion detection method in which replication technology is implemented behind (downstream of) the load balancer component(s), according to at least some embodiments.

FIGS. 6 through 8 illustrate example out-of-band implementations of network traffic monitoring, specifically intrusion detection, according to at least some embodiments, and are not intended to be limiting. FIGS. 17 through 19 are high-level flowcharts of the out-of-band intrusion detect methods as illustrated in FIGS. 6 through 8, according to at least some embodiments. Note that intrusion detection is used by way of example, and is not intended to be limiting. Other types of network traffic monitoring than intrusion detection may be similarly implemented. In each of these out-of-band implementations, network traffic is replicated by replication technology 40 to produce two copies. One copy goes to the client's resource component(s) on the provider network, and the other copy is forwarded or routed to some other destination that performs intrusion detection, which may be referred to as an intrusion detection handler. In at least some embodiments, the client may specify the destination for the copy (which may be referred to as an intrusion detection handler) via a user interface when setting up intrusion detection, for example when adding or configuring load balancer component(s) 18 in the load balancer layer. See, e.g., user interface element 116 in FIG. 11.

The destination for the copy, or intrusion detection handler, may be an intrusion detection appliance or service provided by the service provider on the provider network. Alternatively, the intrusion detection handler may be a third party intrusion detection appliance or service implemented on the provider network or implemented external to the provider network. The intrusion detection handler may also be a client intrusion detection component or appliance implemented in the client's configuration on the provider network or an intrusion detection appliance implemented on the client's network outside the provider network (see, e.g., client network 60 of FIG. 1). In general, the destination for the copy of the data packets generated by the replication technology 40 may be a device or system at any network address on the provider network or external to the network, and in at least some embodiments may be specified by the client, for example via a user interface when setting up intrusion detection.

Note that implementing out-of-band intrusion detection may, but does not necessarily, involve adding new resource component(s) to the client's configuration on the provider network. In various embodiments, the replication technology 40 may be located on or at a resource component already in the client's configuration, on or at a new resource component added to the client's configuration, or may be at a location elsewhere in the provider network infrastructure not in the client's configuration, for example at a resource component that is not part of the client's configuration or at a location on the network substrate as illustrated in FIG. 26.

FIG. 6 illustrates an example out-of-band implementation of intrusion detection in which replication technology is implemented on or at the load balancer component(s), according to at least some embodiments. In this implementation, replication technology 40 is located on or at the load balancer component(s) 18 in the client's data path or stream on the provider network. Traffic to the client's resources received at a load balancer component 18 is replicated by replication technology 40 to produce two copies. One copy goes to load balancing technology on the load balancer component 18, which forwards packets to the client's resource component(s) on the provider network according to a load balancing 20 technique, and the other copy is forwarded or routed from the load balancer component 18 to an intrusion detection handler 50.

In the implementation illustrated in FIG. 6, the load balancer component 18 implements and performs both load balancing 20 and replication 40. The client, however, just sees and manages load balancer component(s) 18 in the load balancer layer. In at least some embodiments, to implement intrusion detection in this implementation, the clients selects "Perform intrusion detection" on a user interface when adding or configuring load balancer component(s) 18 in the load balancer layer (see, e.g., FIGS. 10 through 12). Functionality (e.g., autoscaling, availability, etc.) of the load balancer layer applies to the replication technology 40. In this implementation, there may be no new network hops, layers, or resource components added to the client's configuration, since replication is implemented at new or existing load balancer components 18 in a load balancer layer, and intrusion detection is performed on intrusion detection handlers 50 that may be, but are not necessarily, part of the client's configuration on the provider network.

FIG. 17 illustrates an example out-of-band intrusion detection method in which replication technology is implemented on or at the load balancer component(s), according to at least some embodiments. As indicated at 300, network traffic directed to a client's resources may be received at a load balancer component that includes replication technology. As indicated at 302, the replication technology sends one copy of the network traffic to load balancer technology implemented on the load balancer component and another copy of the network traffic to an intrusion detection handler. As indicated at 304, the load balancer technology load balances the network traffic copy to the client's resource components at an overlay level. As indicated at 306, the intrusion detection handler performs intrusion detection on the other network traffic copy at a network substrate level.

FIG. 7 illustrates an example out-of-band implementation of intrusion detection in which replication technology is implemented in front of (upstream of) the load balancer component(s), according to at least some embodiments. In this implementation, replication technology 40 is located upstream of the load balancer component(s) 18 in the client's data path or stream on the provider network. Traffic to the client's resources is replicated by replication technology 40 to produce two copies. One copy goes to load balancer component(s) 18 that forward packets to the client's resource component(s) on the provider network according to a load balancing 20 technique, and the other copy is forwarded or routed to an intrusion detection handler 50.

In at least some embodiments, in an upstream implementation as shown in FIG. 7, the provider network infrastructure (see, e.g., FIG. 26) may handle routing of the traffic to the replication technology 40, and/or routing of the traffic from the replication technology 40 to the load balancer component(s) 18.

FIG. 18 illustrates an example out-of-band intrusion detection method in which replication technology is implemented in front of (upstream of) the load balancer component(s), according to at least some embodiments. As indicated at 320, network traffic directed to a client's resources may be received at replication technology implemented on the network substrate of a provider network. As indicated at 322, the replication technology sends one copy of the network traffic to a load balancer component or layer and another copy of the network traffic to an intrusion detection handler. As indicated at 324, the load balancer component or layer load balances the network traffic copy to the client's resource components at an overlay level. As indicated at 326, the intrusion detection handler performs intrusion detection on the other network traffic copy at a network substrate level.

FIG. 8 illustrates an example out-of-band implementation of intrusion detection in which replication technology is implemented behind (downstream of) the load balancer component(s), according to at least some embodiments. In this implementation, replication technology 40 is located downstream of the load balancer component(s) 18 in the client's data path or stream on the provider network. Traffic to the client's resources received at a load balancer component 18 is forwarded to the client's resource component(s) on the provider network according to a load balancing 20 technique. This traffic is received at replication technology 40 and replicated by the replication technology 40 to produce two copies. One copy goes to the client's resource component(s) on the provider network, and the other copy is forwarded or routed to an intrusion detection handler 50.

In a downstream implementation of intrusion detection as shown in FIG. 8, the client's traffic may be forwarded by a load balancer component 18 to replication technology 40 instead of to client resource component(s); the replication technology 40 then creates a copy, forwards the load balanced traffic to client resource component(s), and sends the copy to an intrusion detection handler 50. Alternatively, the load balancer component 18 may forward the traffic to client resource component(s); however, the provider network infrastructure (see, e.g., FIG. 26) may route the traffic from the load balancer component 18 to replication technology 40. In this second case, the load balancer component 18 may not need to be aware that the traffic is being routed to replication technology 40. The provider network infrastructure may also handle routing of the traffic from the replication technology 40 to the client resource component(s). In this case, from the perspective of the client resource component(s), the traffic may appear to be coming from the load balancer component 18.

FIG. 19 illustrates an example out-of-band intrusion detection method in which replication technology is implemented behind (downstream of) the load balancer component(s), according to at least some embodiments. As indicated at 340, network traffic directed to a client's resources may be received at a load balancer layer in the client's configuration. As indicated at 342, the load balanced network traffic may be forwarded or routed to replication technology implemented on the network substrate of the provider network. As indicated at 344, the replication technology sends one copy of the network traffic to the client's resource components and another copy of the network traffic to an intrusion detection handler. As indicated at 346, the intrusion detection handler performs intrusion detection on the other network traffic copy at a network substrate level In at least some embodiments, in both the upstream and downstream out-of-band implementations of intrusion detection shown in FIGS. 7 and 8, the client may be agnostic to the intrusion detect implementation and may not need to separately manage an intrusion detection layer, replication technology 40, or intrusion detection handler 50. The client just sees and manages load balancer component(s) 18 in the load balancer layer. In at least some embodiments, to implement intrusion detection in the out-of-band implementations shown in FIGS. 7 and 8, the clients selects "Perform intrusion detection" on a user interface when adding or configuring load balancer component(s) 18 in the load balancer layer (see, e.g., FIGS. 10 through 12). In some embodiments, the client may also specify a destination for the copy of the data made by the replication technology 40 (e.g., to specify an intrusion detection handler by name, network address, or by some other method) as shown in FIG. 11, and/or select either inline or out-of-band intrusion detection as shown in FIG. 12. In at least some embodiments, functionality (e.g., configuration, autoscaling, availability, etc.) of the replication technology 40 may be automatically provided and may be similar to that provided for the load balancer layer.

Replication Technology

Figure 9:
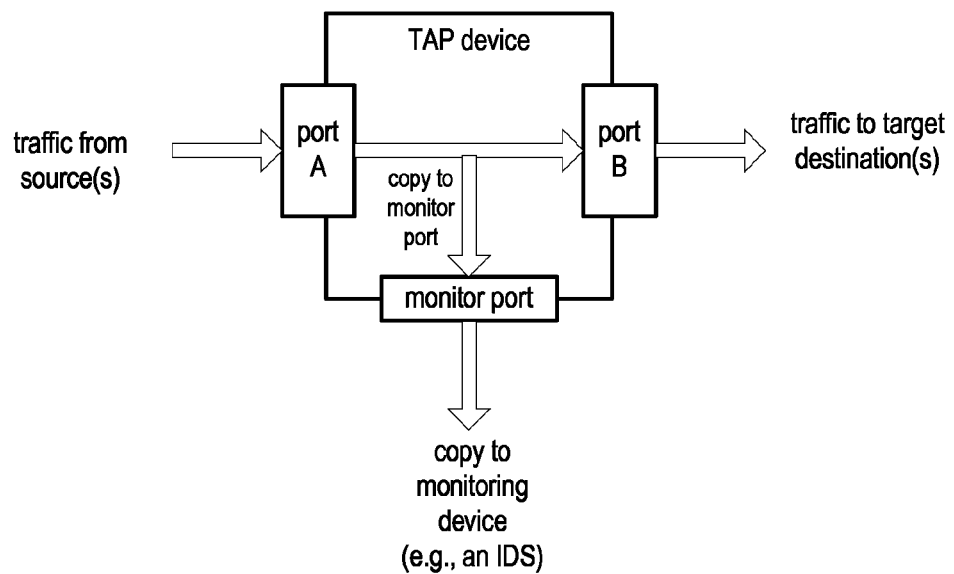
FIG. 9 illustrates an example test access port (TAP) device that may be used in at least some embodiments.

The replication technology used in the out-of-band implementations described above may be implemented in a variety of ways. At least some embodiments may employ network test access port (TAP) device technology implemented on the network substrate of the provider network. A high-level illustration of an example TAP device is shown in FIG. 9. A TAP device may be broadly defined as a network device that has at least three ports: for example an A port, a B port, and a monitor port. The TAP device passes all network traffic through ports A and B unimpeded, but also copies that same data to the monitor port. Note that the TAP device may copy traffic in one or both directions; that is, traffic from A to B may be copied to the monitor port, but not traffic from B to A, or traffic from A to B and from B to A may be copied to the monitor port. At least some embodiments may employ port mirroring technology implemented on the network substrate of the provider network. Port mirroring technology may involve a network switch device configured to send a copy of network packets received at one or more switch ports to a network monitoring connection on another switch port. This technology is sometimes referred to as spanning port technology. Either TAP device technology or port mirroring technology, or both, may be implemented on the network substrate of the provider network to implement replication technology on the provider network at substrate level(s) below the overlay network level that is exposed to the client. Note that other embodiments may use other devices or methods than those described to implement the replication technology. For example, the following describes a method that leverages the network infrastructure and networking methods of the provider network, for example as shown in FIGS. 25 through 28, to implement replication or copying of data packets.

Routing Packets in the Provider Network

As previously mentioned, the client's configuration on the provider network may operate at and only be aware of the overlay network technology; the underlying network substrate technology on which the overlay network is implemented, which may include networking devices such as routers, switches, network address translators (NATs), TAP devices, and so on, is hidden from the client. Packets in the overlay layer may be checked against a mapping directory (e.g., provided by a mapping service as illustrated in FIG. 26) to determine what their substrate target address should be, and vice versa. At least some embodiments may leverage the network technology and methods as illustrated and described in reference to FIGS. 25 through 28 in implementing inline and out-of-band implementations of intrusion detection.

Referring to FIG. 26, in at least some embodiments, all traffic on the provider network may be controlled via a central mapping service (e.g., mapping service 1030 of FIG. 26). A sender (e.g. a router, VMM, host system, etc.) may consult the mapping service 1030 to determine where a packet should be sent. Typically, the returned destination is the "normal" one, e.g. a host that would be expecting this traffic.

In at least some embodiments, the network technology and methods described in reference to FIG. 26 may be leveraged to implement replication of traffic to a device or port on a device that monitors the traffic (e.g., to an intrusion detection handler as illustrated in FIGS. 6 through 8). For example, the networking technology and methods may be modified so that, rather than returning a single destination record for a packet to a requesting sender (e.g., a router, VMM, host system, etc.) as is conventionally done, the mapping service 1030 returns two destination records. One record is for the normal destination of the packet, for example a load balancer component or other resource component of the client's configuration, and the other record indicates a device or component that implements a traffic monitoring technology (e.g., an intrusion detection handler as illustrated in FIGS. 6 through 8). The requesting sender thus receives one packet, but sends two copies of the packet as indicated by the records received from the mapping service 1030, one copy to the normal destination (e.g., some resource component in the client's configuration), and the other copy to the other device or component (e.g., an intrusion detection handler).

Figure 20:
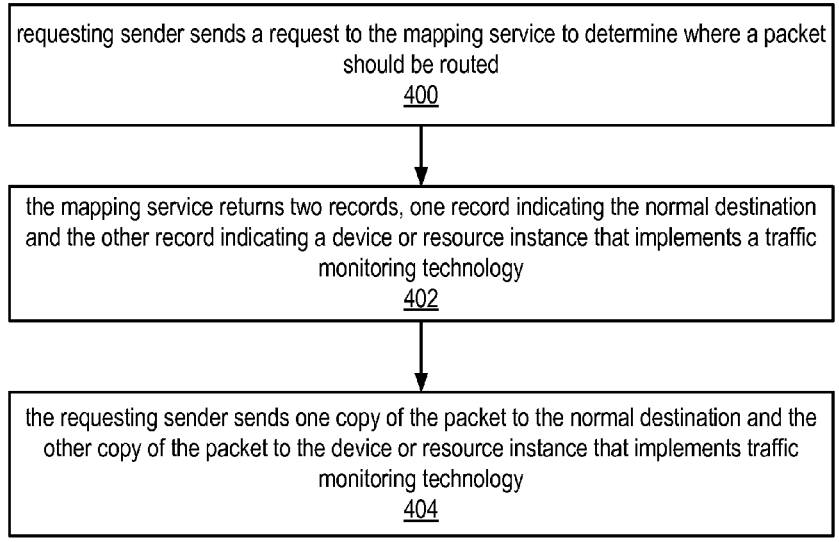
FIG. 20 is a high-level flowchart of a method for replicating traffic on a provider network, according to at least some embodiments.

FIG. 20 is a high-level flowchart of a method for replicating traffic on a provider network, according to at least some embodiments. As indicated at 400, a requesting sender sends a request to a mapping service of the provider network to determine where a packet should be routed. As indicated at 402, the mapping service returns two records, one record indicating the normal destination and the other record indicating a device or resource component that implements a traffic monitoring technology, for example an intrusion detection handler. As indicated at 404, the requesting sender sends one copy of the packet to the normal destination and the other copy of the packet to the device or resource component that implements a traffic monitoring technology, according to the information received from the mapping service.

Figure 21:
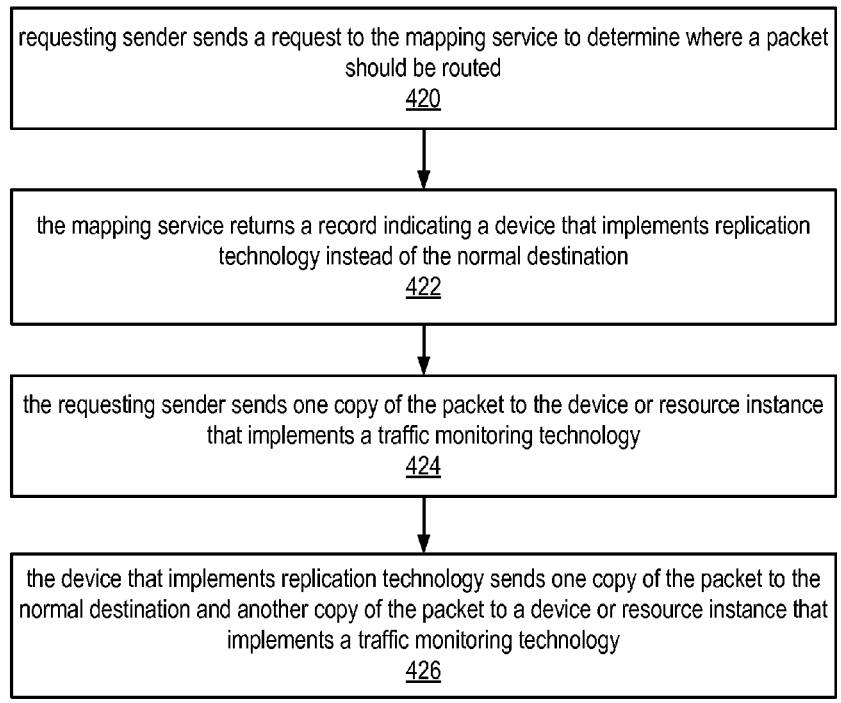
FIG. 21 is a high-level flowchart of another method for replicating traffic on a provider network, according to at least some embodiments.

FIG. 21 is a high-level flowchart of another method for replicating traffic on a provider network, according to at least some embodiments. As indicated at 420, a requesting sender sends a request to the mapping service to determine where a packet should be routed. As an alternative to the above method that sends two records to the requesting sender, the mapping service may return just one record, as indicated at 422. However, instead of the record indicating the normal destination, the record indicates a device (e.g. a TAP device, a port on a switch that implements port mirroring, or some other device) as previously described that implements replication technology, as indicated at 422. As previously described, the replication technology may be implemented on a device on the provider network at a substrate level below the overlay network level that is exposed to the client. The requesting sender thus receives one packet, and sends just one packet to the device that implements replication technology as indicated by the record received from the mapping service, as indicated at 424. The device that receives the packet from the requesting sender replicates the packet, sends one copy to the normal destination (e.g., a load balancer component or other resource component of the client's configuration), and sends the other copy to a device or component that implements a traffic monitoring technology (e.g., an intrusion detection handler as illustrated in FIGS. 6 through 8), as indicated at 426.

Adding Network Traffic Monitoring with a Network Appliance

At least some embodiments of a provider network may provide one or more services that allow a client to add network appliances, such as load balancer appliances or database appliances, to the client's configuration. In these embodiments, the client does not specify and configure individual resource components such as resource instances, but instead specifies via an appliance service (e.g., a load balancer service or a database service) that a network appliance is to be added to the client's configuration, for example a load balancer appliance in front of a set of resource components such as server components, or a database appliance, or in general any type of network appliance that is offered by the provider network to provide some functionality to the client. The client does not configure, and does not view or manage, components that may be used to implement the network appliance on the provider network, but instead just requests the network appliance, and views and manages the appliance. The actual implementation of the network appliance may be hidden from the client, and the network appliance may be managed by the respective appliance service. For example, if the user adds load balancing to the client's configuration via a load balancer service, the load balancer simply shows up as "load balancer X" on the client's console display, even though the load balancer appliance may actually be implemented as one or more components (e.g., resource instances, servers, network devices, etc.) on the provider network. Once added to the client's configuration, the network appliance may be automatically and transparently scaled by the appliance service (autoscaling) to address changes in demand to the client's configuration on the provider network. The appliance may also be automatically managed by the appliance service to provide availability, and otherwise managed by the appliance service. For example, performance of the network appliance may be monitored by the appliance service, and load balancer resource components may be automatically added to, removed from, or reconfigured in the appliance by the appliance service to maintain a performance threshold. However, as noted above, this may all be done transparently to the client, who is only aware of the existence of "appliance X" in the client's configuration on the provider network.

At least some embodiments of the methods and apparatus for providing network traffic monitoring such as intrusion detection may allow a client to add network traffic monitoring (e.g., intrusion detection or intrusion prevention) to a network appliance as described above when adding a new appliance to the client's configuration and/or when reconfiguring an existing appliance. Traffic monitoring technology as described herein may be automatically included in the appliance when the network appliance is added or reconfigured if the client requests that it be included. The traffic monitoring may be implemented according to any of the inline and out-of-band implementations as described herein. Autoscaling, availability, and other functionalities provided by the appliance service for the network appliance may also be applied to the traffic monitoring technology implemented with the appliance.

Figure 22:
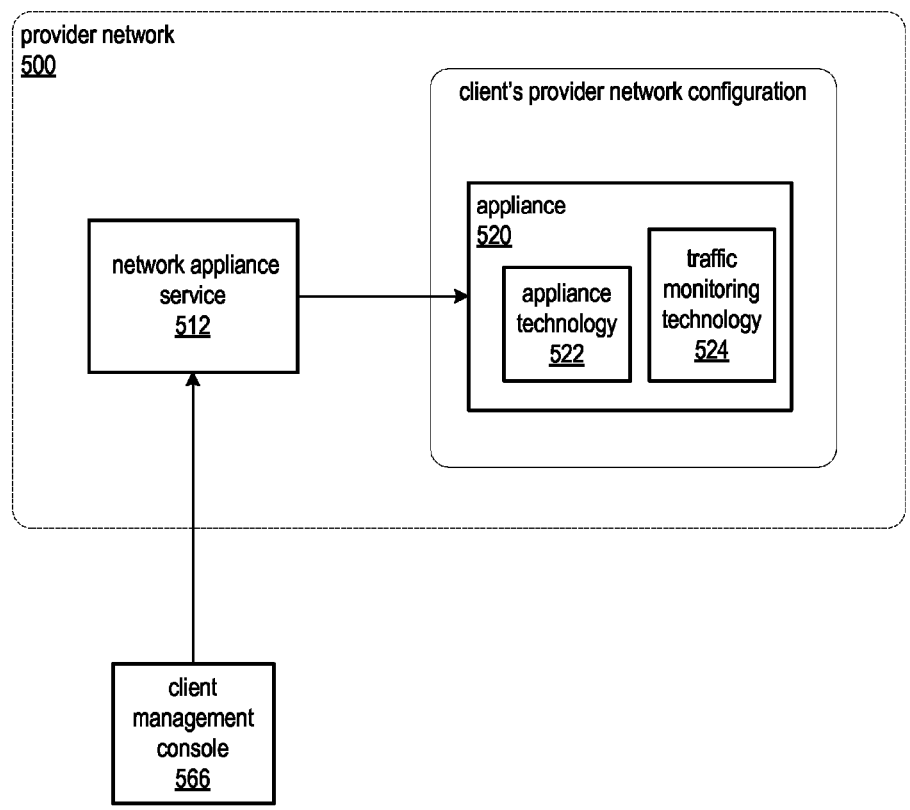
FIG. 22 illustrates an example client configuration on an example provider network to which an appliance that includes network traffic monitoring is added, according to at least some embodiments.

FIG. 22 illustrates an example client configuration on an example provider network to which a network appliance that includes network traffic monitoring is added, according to at least some embodiments. A provider network 500 may include a network appliance service 512 that may be accessed, for example, from a client management console 566, for example via one or more user interfaces to the network appliance service 512 displayable on the client management console 566. By accessing the network appliance service 512 via the client management console 566, the client may add (e.g., purchase, rent, or lease) an appliance 520 to the client's configuration on provider network 500. In at least some embodiments, upon receiving a request for an appliance 520 from the client, the network appliance service 512 may cause one or more components to be allocated to and configured as appliance 520 in the client's configuration. In at least some embodiments, the appliance 520 may include technology 522 that implements functionality of the appliance 520 (e.g., load balancing technology if the appliance is a load balancer appliance). In addition, the appliance 520 may include technology 524 that implements traffic monitoring (e.g., intrusion detection) on the appliance 500.

Figure 23:
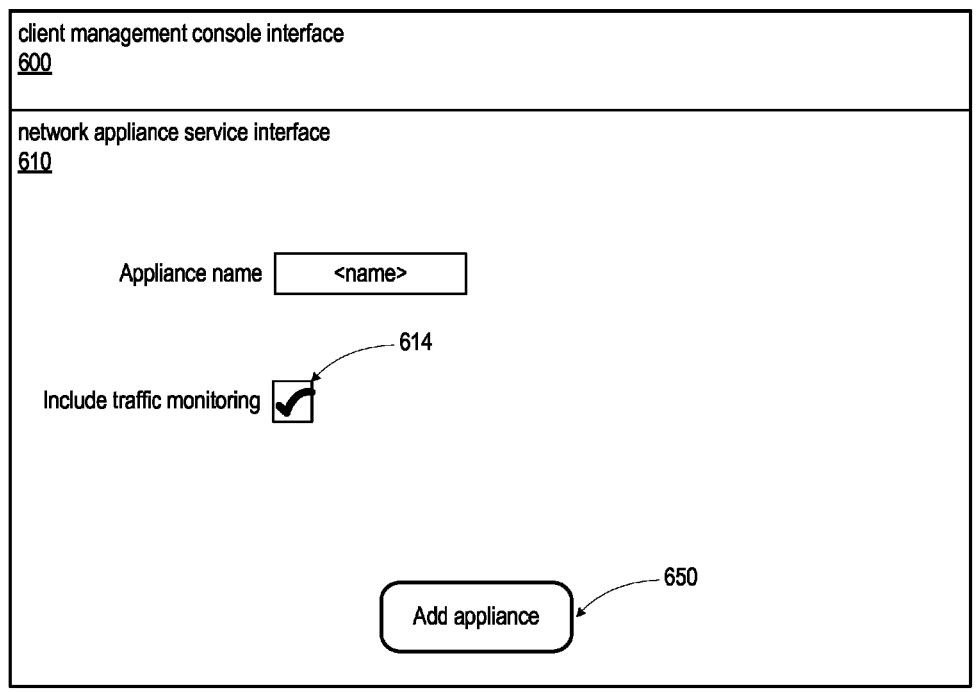
FIG. 23 illustrates an example user interface that may be used to add an appliance that includes network traffic monitoring, according to at least some embodiments.

FIG. 23 illustrates an example user interface that may be used to add an appliance that includes network traffic monitoring, according to at least some embodiments. As shown in FIG. 23, a client management console interface 600 may be provided that allows the client to access a provider network process such as a network appliance service 512 as shown in FIG. 22. The client management console interface 600 may, for example, be displayed on a client management console 566 in the client network, as shown in FIG. 22. However, in at least some embodiments, interface 600 may be displayed on any device via which a client or client's representative may access the provider network.

Via interface 600, the client or client's representative may access a network appliance service interface 610. The network appliance service interface 610 may include one or more user interface elements via which the user can specify various parameters of or preferences for a new appliance that the user wishes to add to the client's configuration on the provider network, or via which the user can change the configuration for an existing appliance in the client's configuration. The parameters or preferences may, for example, include an appliance name as shown in FIG. 23, but in general may include any parameter or preference that may apply to the given appliance. The network appliance being added or configured may be, but is not necessarily, a load balancer appliance. The resource configuration interface 610 may also include a checkbox 614 or other user interface element that the user may select to optionally specify that the client wants traffic monitoring included in the appliance. The resource configuration interface 610 may also include an "add appliance" user interface element 650 that the user may select to add the appliance to (or reconfigure the appliance in) the client's configuration on the provider network. Upon selecting the "add appliance" user interface element 650, the network appliance service may automatically cause the appliance to be added to and configured in the client's configuration. If the user has specified that the client wants traffic monitoring included in the appliance, network traffic monitoring may also be automatically added to and configured for the appliance. Adding and configuring the appliance, including network traffic monitoring if requested, may involve automatically (and transparently) adding and configuring one or more resource components, network devices, or other devices (e.g., server systems) that collectively implement the appliance. However, again note that, to the client, the appliance with the given name was added, and from the client's perspective only the network appliance (e.g., "load balancer X") is added to and visible in the client's configuration.

While not shown, network appliance service interface 610 may also include other user interface elements via which the client can specify a configuration for network traffic monitoring, if element 614 is selected to implement traffic monitoring on the appliance. For example, a user interface element may be provided via which the client can specify a network address to which a copy of the client's network traffic will be sent in out-of-band traffic monitoring implementations. As another example, a user interface element may be provided via which the client can select either an inline or an out-of-band implementation. Note that embodiments may provide other user interface elements via which the client can select or specify other attributes of traffic monitoring, for example a particular IDS or IPS that the client wants to use in either inline or out-of-band implementations.

Figure 24:
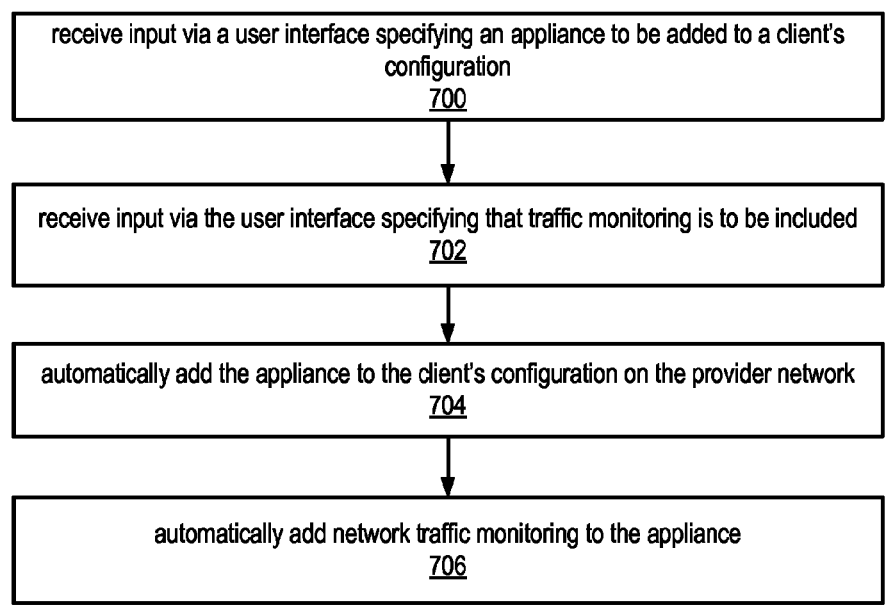
FIG. 24 illustrates a high-level method for adding network traffic monitoring with an appliance in a client's configuration via a user interface, according to at least some embodiments.

FIG. 24 illustrates a high-level method for adding network traffic monitoring with an appliance in a client's configuration via a user interface, according to at least some embodiments. A user interface for adding or configuring resource component(s) may be displayed, for example on a client management console 566 as shown in FIG. 22. For an example user interface that may be used in at least some embodiments see FIG. 23. A network appliance service may receive input via the user interface specifying an appliance to be added to the client's configuration on the provider network, as indicated at 700 of FIG. 24. As indicated at 702, additional input may be received via the user interface specifying that traffic monitoring (e.g., intrusion detection) is to be included in the appliance. For example, the client may select a checkbox 614 or other user interface element as shown in FIG. 23 to specify that the client wants traffic monitoring included in the appliance. Input may be received indicating that the client wants to add or configure the appliance according to the settings on the user interface; for example, the client may select an "add appliance" user interface element 650 as shown in FIG. 23. In response, the network appliance service may cause the appliance to be automatically configured in the client's configuration on the provider network, as indicated at 704. As indicated at 706, the network appliance service may also cause network traffic monitoring technology to be automatically added to the appliance. The network traffic monitoring technology may be implemented in any of several ways including inline and out-of-band implementations as described herein.

Since network traffic monitoring may be added as an option to a network appliance (e.g., a load balancer appliance) added to the client's configuration on the provider network, in at least some embodiments there may be no network traffic monitoring appliances or components for the client to separately manage in the client's configuration on the provider network. In at least some embodiments, the client simply specifies that network traffic monitoring is to be including when adding an appliance such as a load balancer appliance, and network traffic monitoring is automatically included in the appliance implementation. In some embodiments, however, the client may be allowed to specify a particular configuration for network traffic monitoring, for example to specify a particular type of network traffic monitoring (e.g., IDS or IPS), to select either an inline intrusion detection or an out-of-band implementation according to the client's preferences, and/or to select or specify particular technology and/or handlers that the client wants to use.

Service and Usage Charges

In at least some implementations, an entity that is involved in providing network traffic monitoring (e.g., intrusion detection services) may charge for their services, and/or for usage of their products. For example, the operator of the provider network may charge usage or other fees for intrusion detection resource components and/or for other technology used in an intrusion detection implementation. In some implementations, for example, the operator of the provider network may charge fees for bandwidth or network traffic on the provider network generated by an intrusion detection implementation. Alternatively, any charges for intrusion detection may be added on to charges for the resource component(s) (e.g., load balancer component(s)) to which intrusion detection is added according to the methods described herein. As another example, a third-party intrusion detection provider may charge usage or other fees to clients that use resources owned or leased by the third parties. One of ordinary skill in the art will recognize that there are many different models via which these charges may be applied.

Example Provider Network Environments

This section describes example provider network environments in which the above-described embodiments of the methods and apparatus for providing network traffic monitoring may be implemented. However, these example provider network environments are not intended to be limiting.

FIG. 25 illustrates an example provider network environment, according to at least some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

FIG. 26 illustrates an example data center that implements an overlay network on a network substrate using IP tunneling technology, according to some embodiments. A provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 26) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology; the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 26, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 26, at least some networks in which embodiments may be implemented may include hardware virtualization technology that enables multiple operating systems to run concurrently on a host computer (e.g., hosts 1020A and 1020B of FIG. 26), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 26 shows an example provider data center 1000 implementing a network that provides resource virtualization technology and that provides full Internet access via edge router(s) 1014 that connect to Internet transit providers, according to at least some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

Figure 27:
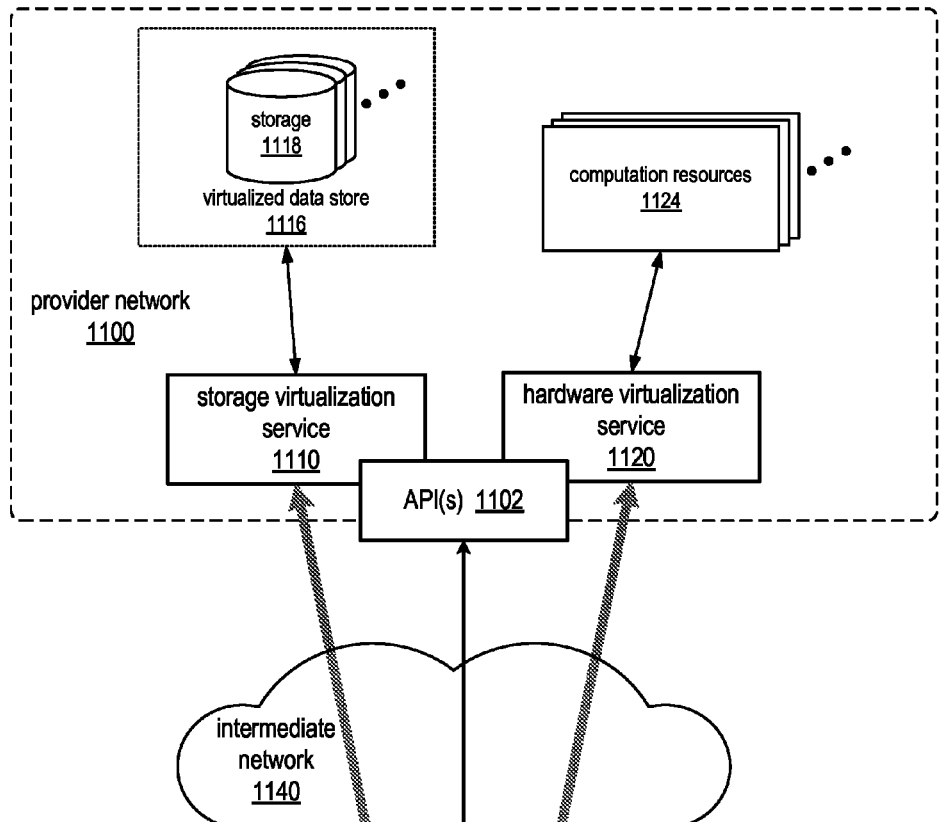
FIG. 27 is a block diagram of an example provider network that provides a storage virtualization service and a hardware virtualization service to clients, according to at least some embodiments.
Figure 27:
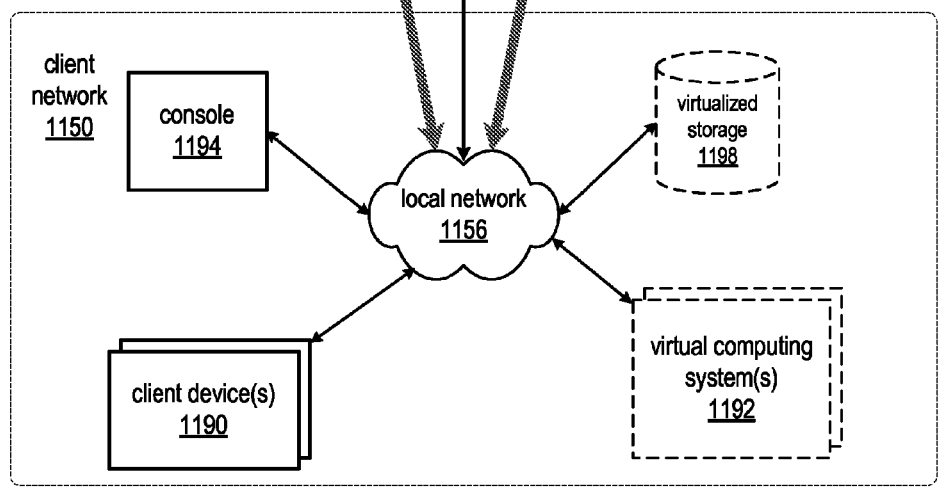

FIG. 27 is a block diagram of an example provider network that provides a storage virtualization service and a hardware virtualization service to clients, according to at least some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access virtual data store 1116 volumes, which appear to the user as local virtualized storage 1198.

While not shown in FIG. 27, the virtualization service(s) may also be accessed from resource instances within the provider network 1100 via API(s) 1102. For example, a client, appliance service provider, or other entity may access a virtualization service from within a respective private network on the provider network 1100 via an API 1102 to request allocation of one or more resource instances within the private network or within another private network.

Figure 28:
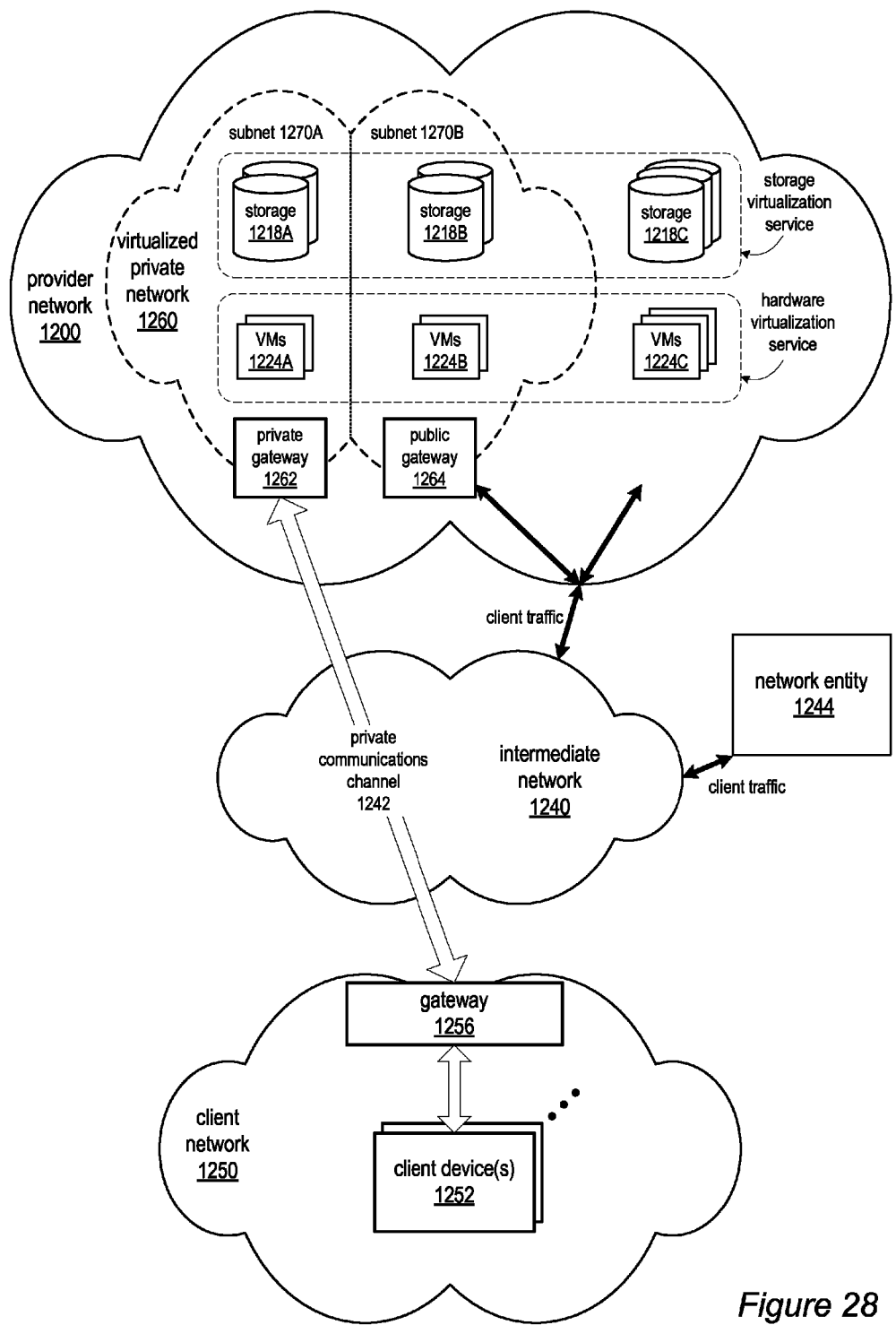
FIG. 28 illustrates an example provider network that provides private networks to at least some clients, according to at least some embodiments.

FIG. 28 illustrates an example provider network that provides private networks on the provider network to at least some clients, according to at least some embodiments. A client's virtualized private network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtualized private network 1260 may be connected to a client network 1250 via a private communications channel 1242. A private communications channel 1242 may, for example, be a tunnel implemented according to a network tunneling technology or some other peering connection over an intermediate network 1240. The intermediate network may, for example, be a shared network or a public network such as the Internet. Alternatively, a private communications channel 1242 may be implemented over a direct, dedicated connection between virtualized private network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 1260 for a client on provider network 1200, one or more resource instances (e.g., VMs 1224A and 1224B and storage 1218A and 1218B) may be allocated to the virtualized private network 1260. Note that other resource instances (e.g., storage 1218C and VMs 1224C) may remain available on the provider network 1200 for other client usage. A range of public IP addresses may also be allocated to the virtualized private network 1260. In addition, one or more networking devices (routers, switches, etc.) of the provider network 1200 may be allocated to the virtualized private network 1260. A private communications channel 1242 may be established between a private gateway 1262 at virtualized private network 1260 and a gateway 1256 at client network 1250.

In at least some embodiments, in addition to, or instead of, a private gateway 1262, virtualized private network 1260 may include a public gateway 1264 that enables resources within virtualized private network 1260 to communicate directly with entities (e.g., network entity 1244) via intermediate network 1240, and vice versa, instead of or in addition to via private communications channel 1242.

Virtualized private network 1260 may be, but is not necessarily, subdivided into two or more subnets 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtualized private network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

At least some embodiments may allow a client to remap public IP addresses in a client's virtualized private network 1260 as illustrated in FIG. 28 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 28 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

Illustrative System

Figure 29:
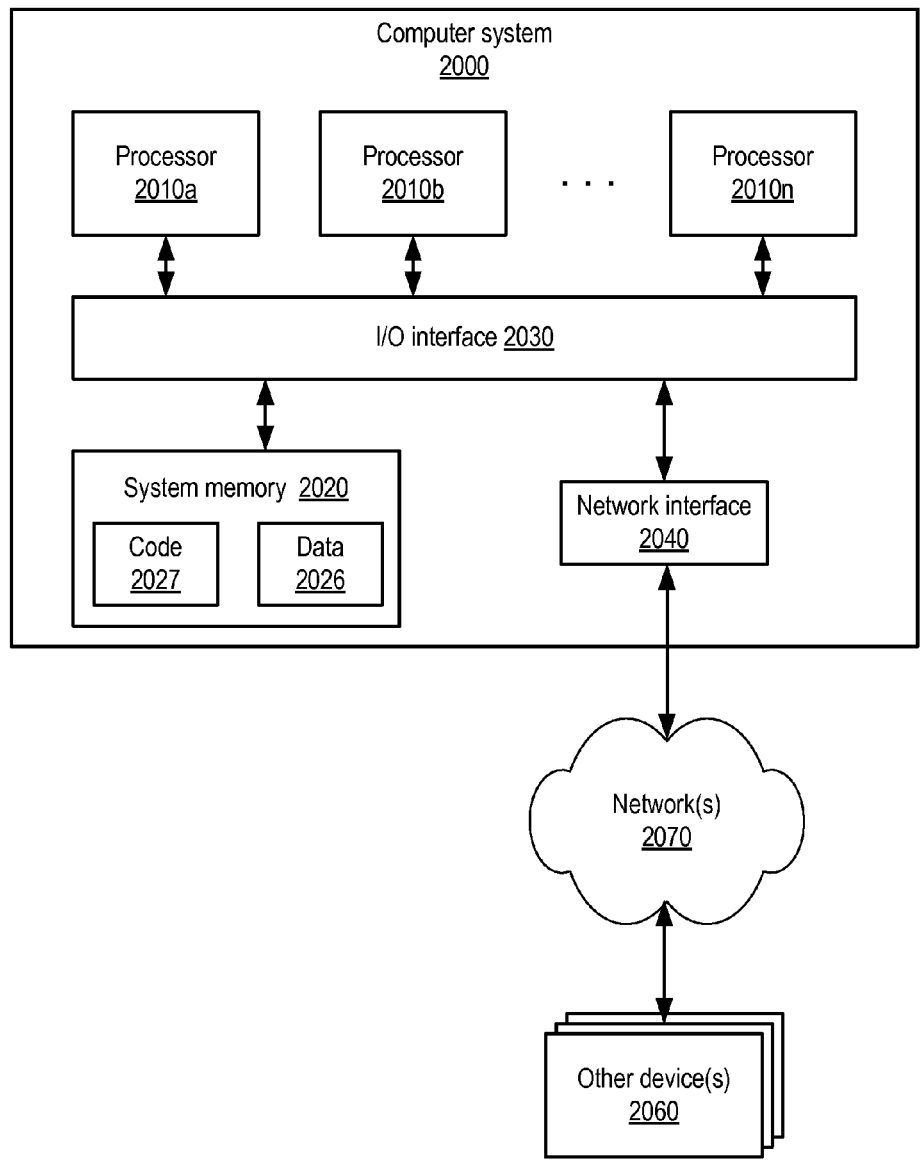
FIG. 29 is a block diagram illustrating an example computer system that may be used in some embodiments.

In at least some embodiments, a server that implements a portion or all of one or more of the technologies, including but not limited to the various service provider and provider network methods and apparatus and the methods and apparatus for providing network traffic monitoring such as intrusion detection services in provider network environments as described herein, may include a general-purpose computer system that includes or is configured to access one or more computer-accessible media, such as computer system 2000 illustrated in FIG. 29. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for service provider and provider network methods and apparatus and the methods and apparatus for providing network traffic monitoring such as intrusion detection services in provider network environments, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example.

In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 25, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 25 for implementing embodiments of service provider and provider network methods and apparatus and the methods and apparatus for providing network traffic monitoring such as intrusion detection services in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    receiving, by a component on a provider network, data packets directed to a client configuration on the provider network, wherein the client configuration is specified by a client external to the provider network, and wherein the provider network provides resources for use by a plurality of other clients external to the provider network;
    applying network traffic monitoring to the data packets according to network traffic monitoring technology implemented on the component; and
    routing or forwarding the data packets to at least one component in the client configuration on the provider network;
    wherein the provider network implements an overlay network level, wherein implementing the overlay network level includes the data packets being encapsulated at the overlay network level and being communicated at a network substrate level to a substrate level destination where the encapsulation is removed from the data packets, and the data packets being communicated to an overlay network level destination after the encapsulation is removed, wherein the client configuration operates at the overlay network level of the provider network, and wherein the network traffic monitoring technology provides network traffic monitoring of the encapsulated data packets being communicated at the substrate level of the provider network for the client configuration, wherein the substrate level of the provider network is hidden from the client configuration at the overlay network level.

2. The method as recited in claim 1, wherein the network traffic monitoring is one of intrusion detection, intrusion prevention, data loss prevention, network analytics, traffic analysis, or network forensics data collection.

3. The method as recited in claim 1, wherein the component is a load balancer component in the client configuration that also implements load balancer technology, and wherein the method further comprises applying load balancing to the data packets prior to said routing or forwarding the data packets to the at least one component.

4. The method as recited in claim 1, wherein the data packets are received at the component that implements network traffic monitoring technology from a load balancer component in the client configuration that applies load balancing to the data packets.

5. The method as recited in claim 1, wherein the at least one component in the client configuration to which the data packets are routed or forwarded includes at least one load balancer component that applies load balancing to the data packets.

6. The method as recited in claim 1, further comprising, prior to said receiving:
    obtaining, by a management process of the provider network, input for configuring the component, wherein the input includes an indication that network traffic monitoring is to be implemented on the component; and
    configuring the component in the client configuration according to the input, wherein said configuring includes implementing the network traffic monitoring technology on the component.

7. The method as recited in claim 1, wherein the provider network includes a plurality of components, the plurality of components including virtualized computing resources implemented on multi-tenant hardware shared by two or more clients of the provider network.

8. A provider network, comprising:
    a client configuration that includes a plurality of components of the provider network allocated to a respective client, wherein the client configuration is specified by a client external to the provider network, and wherein the provider network provides resources for use by a plurality of other clients external to the provider network;
    at least one device implementing a service of the provider network, the service operable to configure one or more of the plurality of components in the client configuration to perform a function in the client configuration and to also perform network traffic monitoring for the client configuration;

wherein, to configure the one or more components in the client configuration to also perform network traffic monitoring for the client configuration, the service is operable to configure a same component of the provider network to:

receive data packets directed to the client configuration on the provider network;

apply network traffic monitoring to the data packets according to network traffic monitoring technology implemented on the same component; and route or forward the data packets to at least one other component in the client configuration on the provider network such that the network traffic monitoring is performed inline with the network flow of the data packets to the at least one other component in the client configuration;

wherein the provider network implements an overlay network on a network substrate such that the data packets are encapsulated at the overlay network level and are communicated at a network substrate level to a substrate level destination where the encapsulation is removed from the data packets, and the data packets are communicated to an overlay network level destination after the encapsulation is removed, wherein the client configuration is implemented at the overlay network level, and wherein the network traffic monitoring is performed at the network substrate level.

9. The provider network as recited in claim 8, wherein the service is operable to configure the one or more components in the client configuration to also perform network traffic monitoring for the client configuration in response to input from the client via an interface to the service, said input indicating that network traffic monitoring is to be implemented at the one or more components.

10. The provider network as recited in claim 8, wherein the network traffic monitoring is one of intrusion detection, intrusion prevention, data loss prevention, network analytics, traffic analysis, or network forensics data collection.

11. The provider network as recited in claim 8, wherein the function is load balancing, and wherein the one or more components are load balancer components that perform load balancing of network traffic to two or more other components in the client configuration.

12. The provider network as recited in claim 8, wherein the same component is further configured to perform the function on the data packets prior to said route or forward the data packets to at least one other component in the client configuration on the provider network.

13. The provider network as recited in claim 8, wherein the one or more components are implemented at a layer in the client configuration, and wherein implementing network traffic monitoring at one or more components allows network traffic monitoring to be managed as part of the layer.

14. The provider network as recited in claim 8, wherein the one or more components are configured to:

apply the function to the data packets; and forward or route the data packets to the same component configured to apply network traffic monitoring to the data packets.

15. The provider network as recited in claim 8, wherein the one or more components are configured to:

apply the function to the data packets; and forward the data packets to target components in the client configuration;

wherein a network substrate of the provider network is operable to route the data packets forwarded by the one or more components to the same component that applies network traffic monitoring to the data packets.

16. The provider network as recited in claim 15, wherein, to route or forward the data packets to the at least one other component in the client configuration on the provider network, the same component configured to apply network traffic monitoring to the data packets is further configured to forward the data packets to the target components in the client configuration.

17. The provider network as recited in claim 8, wherein the at least one other component in the client configuration to which the data packets are routed or forwarded are the one or more components in the client configuration configured to perform the function in the client configuration.

18. The provider network as recited in claim 8, wherein the same component is further configured to send network traffic monitoring information to one or more other devices, wherein the one or more other devices are on the provider network or on a network external to the provider network.

19. The provider network as recited in claim 8, wherein the components of the provider network include virtualized computing resources implemented on multi-tenant hardware shared by two or more clients of the provider network.

20. A non-transitory computer-accessible storage medium storing program instructions computer-executable to implement a network appliance service on a provider network, the network appliance service operable to:

obtain input requesting that network traffic monitoring be included as an option with a network appliance in a client configuration on the provider network, wherein the network appliance comprises one or more components of the provider network configured to perform a function in the client configuration, and wherein the client configuration comprises components of the provider network that are allocated to a respective client, wherein the client configuration is specified by a client external to the provider network, and wherein the provider network provides resources for use by a plurality of other clients external to the provider network; and in response to said input, configure a same component of the network appliance to:

receive data packets directed to the client configuration on the provider network;

apply network traffic monitoring to the data packets according to network traffic monitoring technology implemented on the same component; and route or forward the data packets to at least one other component in the client configuration on the provider network such that the network traffic monitoring is performed inline with the network flow of the data packets to the at least one other component in the client configuration;

wherein the provider network implements an overlay network on a network substrate such that the data packets are encapsulated at the overlay network level and are communicated at a network substrate level to a substrate level destination where the encapsulation is removed from the data packets, and the data packets are communicated to an overlay network level destination after the encapsulation is removed, wherein the client configuration operates at the overlay network level, and wherein the network appliance is configured to provide the network traffic monitoring for the client configuration at the network substrate level of the provider network.

21. The non-transitory computer-accessible storage medium as recited in claim 20, wherein the network traffic monitoring is one of intrusion detection, intrusion prevention, data loss prevention, network analytics, traffic analysis, or network forensics data collection.

22. The non-transitory computer-accessible storage medium as recited in claim 20, wherein the network appliance is one of a load balancing appliance or a database appliance, wherein a load balancing appliance provides load balancing of network traffic to two or more components of the client configuration, and wherein a database appliance implements database functionality on the client configuration.

23. The non-transitory computer-accessible storage medium as recited in claim 20, wherein the same component is further configured to apply the function of the network appliance to the data packets prior to said route or forward of the data packets to the at least one other component.

24. The non-transitory computer-accessible storage medium as recited in claim 20, wherein including network traffic monitoring with the network appliance enables the network appliance service to provide autoscaling and availability for network traffic monitoring along with autoscaling and availability for the function performed by the network appliance.

25. The non-transitory computer-accessible storage medium as recited in claim 20, wherein the one or more components of the network appliance are configured to:
apply the function to the data packets; and
forward or route the data packets to the same component that applies network traffic monitoring to the data packets.

26. The non-transitory computer-accessible storage medium as recited in claim 20, wherein the at least one other component in the client configuration to which the data packets are routed or forwarded are the one or more components of the network appliance.

27. The non-transitory computer-accessible storage medium as recited in claim 20, wherein the same component is further operable to send network traffic monitoring information to one or more other devices, wherein the one or more other devices are on the provider network or on a network external to the provider network.

28. The non-transitory computer-accessible storage medium as recited in claim 20, wherein the components of the provider network include virtualized computing resources implemented on multi-tenant hardware shared by two or more clients of the provider network.

\* \* \* \* \*